United States Patent
Tidestav et al.

(10) Patent No.: US 12,407,485 B2
(45) Date of Patent: Sep. 2, 2025

(54) IMPLICIT UPDATE OF ACTIVATED TCI STATES

(71) Applicant: Telefonaktiebolaget LM Ericsson (publ), Stockholm (SE)

(72) Inventors: Claes Tidestav, Bålsta (SE); Andreas Nilsson, Gothenburg (SE); Jianwei Zhang, Solna (SE); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 337 days.

(21) Appl. No.: 18/250,385

(22) PCT Filed: Oct. 22, 2021

(86) PCT No.: PCT/SE2021/051063
§ 371 (c)(1),
(2) Date: Apr. 25, 2023

(87) PCT Pub. No.: WO2022/093098
PCT Pub. Date: May 5, 2022

(65) Prior Publication Data
US 2023/0421340 A1 Dec. 28, 2023

Related U.S. Application Data

(60) Provisional application No. 63/105,642, filed on Oct. 26, 2020.

(51) Int. Cl.
*H04L 5/00* (2006.01)
*H04W 72/04* (2023.01)
(Continued)

(52) U.S. Cl.
CPC ........... *H04L 5/0096* (2013.01); *H04W 72/04* (2013.01); *H04W 72/232* (2023.01); *H04W 72/542* (2023.01)

(58) Field of Classification Search
CPC ............. H04L 5/0096; H04W 72/542; H04W 72/232; H04W 72/04
See application file for complete search history.

(56) References Cited

U.S. PATENT DOCUMENTS

2023/0188308 A1* 6/2023 Karjalainen ......... H04B 7/0408
                                                          370/336
2024/0259053 A1* 8/2024 Canonne-Velasquez ....................
                                                          H04B 7/0626

FOREIGN PATENT DOCUMENTS

WO    2020157703 A1    8/2020

OTHER PUBLICATIONS

International Search Report and Written Opinion dated Jan. 19, 2022 for International Application No. PCT/SE2021/051063 filed Oct. 22, 2021, consisting of 12-pages.
(Continued)

*Primary Examiner* — Wayne H Cai
(74) *Attorney, Agent, or Firm* — Weisberg I.P. Law, P.A.

(57) ABSTRACT

Systems and methods for implicitly activating one or more Transmission Configuration Indicator (TCI) states are provided. In some embodiments, a method performed by a wireless communication device for implicit TCI state activation includes sending a measurement report for one or more reference signals to a base station. The one or more reference signals are related to one or more TCI states, respectively. The method further includes activating at least one TCI state from among the one or more TCI states that are related to the one or more reference signals. In this way, the TCI state selection may be expedited and simplified because additional Medium Access Control (MAC) Control Element (CE) activation message may be avoided.

18 Claims, 22 Drawing Sheets

(51) Int. Cl.
*H04W 72/232* (2023.01)
*H04W 72/542* (2023.01)

(56) References Cited

OTHER PUBLICATIONS

3GPP TS 38.331 V15.6.0; 3rd Generation Partnership Project; Technical Specification Group Radio Access Network; NR; Radio Resource Control (RRC) protocol specification (Release 15); Jun. 2019, consisting of 519-pages.
ETSI TS 138 214 V16.3.0; Technical Specification 5G; NR; Physical layer procedures for data (3GPP TS 38.214 version 16.3.0 Release 16), Nov. 2020, consisting of 169-pages.
ETSI TS 138 321 V16.2.1; Technical Specification 5G; NR; Medium Access Control (MAC) protocol specification 3GPP TS 38.321 version 16.2.1 Release 16), Nov. 2020, consisting of 156-pages.
3GPP TSG RAN WG1#103e R1-208346; Title: Considerations on the enhancement of multi-beam operation; Agenda Item: 8.1.1; Source: Sony; Document for: Discussion; Date and Location: Oct. 26-Nov. 13, 2020, E-meeting, consisting of 12-pages.
3GPP TSG RAN WG1 #102-e R1-2005983; Title: Enhancements on Multi-Beam Operation; Agenda Item: 8.1.1; Source: OPPO; Document for: Discussion and Decision; Date and Location: Aug. 17-28, 2020, e-Meeting, consisting of 4-pages.

\* cited by examiner

*TCI-State information element*

```
-- ASN1START
-- TAG-TCI-STATE-START

TCI-State ::=        SEQUENCE{
    tci-StateId          TCI-StateId,
    qcl-Type1            QCL-Info,
    qcl-Type2            QCL-Info                                   OPTIONAL,  -- Need R
    ...
}

QCL-Info ::=         SEQUENCE{
    cell                 ServCellIndex
    bwp-Id               BWP-Id                                     OPTIONAL,  -- Need R
    referenceSignal      CHOICE {                                   OPTIONAL,  -- Cond CSI-RS-Indicated
        csi-rs               NZP-CSI-RS-ResourceId,
        ssb                  SSB-Index
    },
    qcl-Type             ENUMERATED {typeA, typeB, typeC, typeD}
    ...
}

-- TAG-TCI-STATE-STOP
-- ASN1STOP
```

*FIG. 1*

| TCI STATES FOR IMPLICIT UPDATE |
|---|
| TCI STATE#1 |
| TCI STATE#2 |
| TCI STATE#3 |
| TCI STATE#4 |
| TCI STATE#5 |
| TCI STATE#6 |

| TCI STATES FOR IMPLICIT UPDATE | SERVING CELL INDEXES |
|---|---|
| TCI STATE#1 | SERVING CELL#1 |
| TCI STATE#2 | SERVING CELL#2 |
| TCI STATE#3 | SERVING CELL#3 |
| TCI STATE#4 | SERVING CELL#4 |
| TCI STATE#5 | |
| TCI STATE#6 | |

FIG. 10

| TCI STATES FOR IMPLICIT UPDATE | SSB INDEX | SERVING CELL INDEXES |
|---|---|---|
| TCI STATE#1 | SSB#1 | SERVING CELL#1 |
| TCI STATE#2 | SSB#2 | SERVING CELL#2 |
| TCI STATE#3 | SSB#3 | SERVING CELL#3 |
| TCI STATE#4 | SSB#4 | SERVING CELL#4 |
| TCI STATE#5 | SSB#5 | |
| TCI STATE#6 | SSB#6 | |

| TCI STATES FOR IMPLICIT UPDATE | SSB INDEX |
|---|---|
| TCI STATE#1 | SSB#1 |
| TCI STATE#2 | SSB#2 |
| TCI STATE#3 | SSB#3 |
| TCI STATE#4 | SSB#4 |
| TCI STATE#5 | SSB#5 |
| TCI STATE#6 | SSB#6 |

*FIG. 11*

| TCI STATES FOR IMPLICIT UPDATE | SSB INDEX |
|---|---|
| TCI STATE#1, SERVING CELL#1<br>TCI STATE#2, SERVING CELL#2<br>TCI STATE#2, SERVING CELL#3 | SSB#1, SERVING CELL#1 |
| TCI STATE#2, SERVING CELL#1<br>TCI STATE#3, SERVING CELL#2<br>TCI STATE#3, SERVING CELL#3 | SSB#1, SERVING CELL#1 |
| TCI STATE#3, SERVING CELL#1<br>TCI STATE#4, SERVING CELL#2<br>TCI STATE#4, SERVING CELL#3 | SSB#1, SERVING CELL#1 |
| TCI STATE#5, SERVING CELL#1<br>TCI STATE#6, SERVING CELL#2<br>TCI STATE#6, SERVING CELL#3 | SSB#1, SERVING CELL#1 |

FIG. 12

IMPLICIT UPDATE OF ACTIVATED TCI STATES

CROSS-REFERENCE TO RELATED APPLICATIONS

This application is a Submission Under 35 U.S.C. § 371 for U.S. National Stage Patent Application of International Application No.: PCT/SE2021/051063, filed Oct. 22, 2021 entitled "IMPLICIT UPDATE OF ACTIVATED TCI STATES," which claims priority to U.S. Provisional Application No. 63/105,642, filed Oct. 26, 2020, entitled "IMPLICIT UPDATE OF ACTIVATED TCI STATES," the entireties of both of which are incorporated herein by reference.

TECHNICAL FIELD

The present disclosure relates to one or several activated Transmission Configuration Indicator (TCI) states for a wireless communication device (e.g., User Equipment (UE)), which are implicitly updated based on a new radio base station (gNB) beam sweep report signaled from the wireless communication device and the gNB.

BACKGROUND

In a typical millimeter wave (mmWave) product implementation, a wireless communication device (e.g., User Equipment (UE)) is configured to report N best Synchronization Signal Block (SSB) beams and corresponding Reference Signal Received Power (RSRP)/Signal-To-Interference-plus-Noise Ratio (SINR) in order to track which a new radio base station (gNB) beam to use when the wireless communication device moves around in the cell. In case a new best SSB beam has been reported, the gNB typically wants to switch the currently used gNB beam for that UE from currently used SSB beam to the newly reported best SSB beam. This can for example be done by updating the currently used Transmission Configuration Indicator (TCI) state/spatial relations.

1.1 Quasi Co-Located (QCL) and TCI States

In Third Generation Partnership Project (3GPP) New Radio (NR), several signals can be transmitted from different antenna ports of a same base station. These signals can have the same large-scale properties such as Doppler shift/spread, average delay spread, or average delay. These antenna ports are then said to be "QCL".

If the User Equipment (UE) knows that two antenna ports are QCL with respect to a certain parameter (e.g., Doppler spread), the UE can estimate that parameter based on one of the antenna ports and apply that estimate for receiving signal on the other antenna port. For example, there may be a QCL relation between a Channel State Information Reference Signal (CSI-RS) for Tracking Reference Signal (TRS) and the Physical Downlink Shared Channel (PDSCH) Demodulation Reference Signal (DMRS). When the UE receives the PDSCH DMRS, the UE can use the measurements already made on the TRS to assist the DMRS reception.

Information about what assumptions can be made regarding QCL is signaled to the UE from the network. In NR, four types of QCL relations between a transmitted source RS and transmitted target reference signal (RS) were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same receive (Rx) beam to receive them. This is helpful for a UE that uses analog beamforming to receive signals, since the UE needs to adjust its Rx beam in some direction prior to receiving a certain signal. If the UE knows that the signal is spatially QCL with some other signal it has received earlier, then it can safely use the same Rx beam to also receive this signal. Note that for beam management, the discussion mostly revolves around QCL Type D, but it is also necessary to convey a Type A QCL relation for the Reference Signals (RSs) to the UE, so that it can estimate all the relevant large-scale parameters.

Typically, this is achieved by configuring the UE with a CSI-RS for TRS for time/frequency offset estimation. To be able to use any QCL reference, the UE would have to receive it with a sufficiently good Signal to Interference plus Noise Ratio (SINR). In many cases, this means that the TRS must be transmitted in a suitable beam to a certain UE.

In typical mmWave network implementations, the TCI states are typically "directly" or "indirectly" spatially related to an SSB. A TCI state can be said to be "directly" spatially related to an SSB when the QCL type-D source RS of that TCI state is an SSB, while a TCI state can be said to be "indirectly" spatially related to an SSB, in case the TCI state uses a TRS (or other CSI-RS) as QCL type-D resource RS, and where this TRS (or other CSI-RS) in turn is configured with a TCI state that has an SSB as QCL type-D as source RS.

To introduce dynamics in beam and Transmission/Reception Point (TRP) selection, the UE can be configured through Radio Resource Control (RRC) signaling with up to 128 TCI states. FIG. 1 illustrates the TCI state information element (reproduced from section 6.3.2 ("Radio resource control information elements") of 3GPP TS 38.331 V16.2.0)

Each TCI state contains QCL information related to one or two RSs. For example, a TCI state may contain CSI-RS1 associated with QCL Type A and CSI-RS2 associated with QCL Type D. If a third RS, e.g. the PDCCH DMRS, has this TCI state as QCL source, it means that the UE can derive Doppler shift, Doppler spread, average delay, delay spread from CSI-RS1 and Spatial Rx parameter (i.e., the Rx beam to use) from CSI-RS2 when performing the channel estimation for the PDCCH DMRS.

A first list of available TCI states is configured for PDSCH, and a second list of TCI states is configured for PDCCH. Each TCI state contains a pointer, known as TCI State ID, which points to the TCI state. The network then activates, via Medium Access Control (MAC) Control Element (CE), one TCI state for PDCCH (i.e., provides a TCI for PDCCH) and up to eight TCI states for PDSCH. The number of active TCI states the UE supports is a UE capability, but the maximum is eight (8).

Assume that a UE has four (4) activated TCI states (from a list of totally 64 configured TCI states). Hence, sixty (60) TCI states are inactive for this particular UE, and the UE needs not be prepared to have large scale parameters estimated for those inactive TCI states. But the UE continuously tracks and updates the large scale parameters for the RSs in the four active TCI states. When scheduling a PDSCH to a UE, the Downlink Control Information (DCI) contains a pointer to one activated TCI state. The UE then knows which large scale parameter estimate to use when performing PDSCH DMRS channel estimation and thus PDSCH demodulation.

As long as the UE can use any of the currently activated TCI states, it is sufficient to use DCI signaling. However, at some point in time, none of the RSs in the currently activated TCI states can be received by the UE, i.e., when the UE moves out of the beams in which the RSs in the activated TCI states are transmitted. When this happens (or actually before this happens), the gNB would have to activate new TCI states. Typically, since the number of activated TCI states is fixed, the gNB would also have to deactivate one or more of the currently activated TCI states.

FIG. 2 illustrates the two-step procedure related to TCI state update. As illustrated, the UE decides whether it needs to update the current TCI state (step 200). If YES, the UE selects a new TCI state with DCI (step 202). Next, the UE decides whether it needs to activate a new set of TCI states (step 204). If YES (step 206), the UE activates new TCI states using MAC CE. If NO (step 208), the above step 200 is repeated.

1.2 TCI States Activation/Deactivation for UE-Specific PDSCH Via MAC CE

Details of the MAC CE signaling that is used to activate/deactivate TCI states for UE specific PDSCH are now provided. FIG. 3 illustrates the structure of the MAC CE for activating/deactivating TCI states for UE specific PDSCH, which corresponds to FIG. 6.1.3.14-1 ("TCI States Activation/Deactivation for UE-specific PDSCH MAC CE") of 3GPP TS 38.321 V16.2.1

As shown in FIG. 3, the MAC CE contains the following fields:

Serving Cell ID: This field indicates the identity of the Serving Cell for which the MAC CE applies. The length of the field is 5 bits;

BandWidth Part (BWP) ID: This field contains the ID corresponding to a downlink bandwidth part for which the MAC CE applies. The BWP ID is given by the higher layer parameter BWP-Id as specified in 3GPP TS 38.331. The length of the BWP ID field is 2 bits since a UE can be configured with up to 4 BWPs for DL;

A variable number of fields $T_i$: If the UE is configured with a TCI state with TCI State ID i, then then the field $T_i$ indicates the activation/deactivation status of the TCI state with TCI State ID i. If the UE is not configured with a TCI state with TCI State ID i, the MAC entity shall ignore the $T_i$ field. The $T_i$ field is set to "1" to indicate that the TCI state with TCI State ID i shall be activated and mapped to the codepoint of the DCI Transmission Configuration Indication field, as specified in 3GPP TS 38.214 V16.3.0. The $T_i$ field is set to "0" to indicate that the TCI state with TCI State ID i shall be deactivated and is not mapped to the codepoint of the DCI Transmission Configuration Indication field. It should be noted that the codepoint to which the TCI State is mapped is determined by the ordinal position among all the TCI States with $T_i$ field set to "1". That is the first TCI State with $T_i$ field set to "1" shall be mapped to the codepoint value 0 of DCI Transmission Configuration Indication field, the second TCI State with $T_i$ field set to "1" shall be mapped to the codepoint value 1 of DCI Transmission Configuration Indication field, and so on. In NR Rel-15, the maximum number of activated TCI states is 8;

A Reserved bit R: this bit is set to '0' in NR Rel-15.

Note that the TCI States Activation/Deactivation for UE-specific PDSCH MAC CE is identified by a MAC PDU subheader with logical channel ID (LCID) as specified in Table 6.2.1-1 of 3GPP TS 38.321 V16.2.1 (this table is reproduced below in Table 1). The MAC CE for Activation/Deactivation of TCI States for UE-specific PDSCH has variable size.

TABLE 1

Reproduction of Table 6.2.1-1 Values of LCID for DL-SCH from 3GPP TS 38.321 V16.2.1

| Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

1.3 TCI State Indication for UE-Specific PDSCH Via DCI

The gNB can use DCI format 1_1 or 1_2 to indicate to the UE that it shall use one of the activated TCI states for the subsequent PDSCH reception. The field being used in the DCI is Transmission configuration indication, which is 3 bits if tci-PresentInDCI is "enabled" or tci-PresentForDCI-Format1-2-r16 is present respectively for DCI format 1_1 and DCI 1_2 by higher layer. One example of such a DCI indication is depicted in FIG. 4.

DCI code point 0 indicates the first TCI state index in the list of TCI states, DCI code point 1 indicates the second TCI state index in the list, and so on.

1.4 MAC CE Activation and DCI Indication

Similar mechanisms as described in Section 1.2 and 1.3 above are also being defined for associating the spatial relation of PUCCH, SRS, where a MAC CE is defined representing the activated spatial relation where the number of spatial relations corresponds to the number of bits used in DCI. For PUCCH, in DCI formats 1_0/1_1, "PUCCH Resource Indicator" field is 3 bits. In Rel-15, a MAC CE (given in clause 6.1.3.18 of 3GPP TS 38.321 V16.2.1) provides the spatial relation for each PUCCH resource. The MAC CE contains a 'PUCCH Resource ID' field with 7 bits, and one out of 8 Spatial relation information's to the PUCCH resource with the given 'PUCCH Resource ID'. The field size of 7 bits for the 'PUCCH Resource ID' field is derived from the maxNrofPUCCH-Resources which is 128.

1.4.1 Single-PDCCH Based DL Data Transmission Over Multiple TRPs

A PDSCH may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI.

FIG. 5 illustrates one example of PDSCH transmission over two TRPs using a single DCI. As illustrated, different layers of a PDSCH with a single codeword (e.g., CW0) are sent over two TRPs, each associated with a different TCI state. In this case, two DMRS ports, one for each layer, in two Code Division Multiplexing (CDM) groups are also signaled to the UE. A first TCI state is associated with the DMRS port in a first CDM group, and a second TCI state is associated with the DMRS port in a second CDM group. This approach is often referred to as Non-Coherent Joint Transmission (NC-JT) or scheme 1a in NR Rel-16 3GPP discussions.

The network configures the UE with multiple TCI states via RRC, and a new MAC CE was introduced in NR Rel-16 to enable multi-TRP transmission in the downlink. FIG. 6 illustrates the enhanced PDSCH MAC CE, which is from clause 6.1.3.24 ("Enhanced TCI States Activation/Deactivation PDSCH MAC CE for Single-DCI based PDSCH Multi-TRP transmission") in TS 38.321 V16.2.1. This MAC CE can be used to map a codepoint in the TCI field to one or two TCI states.

In this enhanced PDSCH MAC CE, TCI state $ID_{i,j}$ denotes the $j^{th}$ TCI state indicated for the $I^{th}$ codepoint in the TCI field of DCI. Furthermore, the $C_{i\_field}$ in MAC CE indicates if an additional TCI state is associated with the $I^{th}$ codepoint in the TCI field of DCI. TCI state $ID_{i,j}$ and the $C_i$ field in MAC CE are hence used to provide mapping of activated TCI states to codepoints of TCI field in DCI. The TCI state $ID_{i,j}$ also provides the activated TCI states for PDSCH. For example, if $C_i$ field is set to 0, then there is only 1 TCI state (i.e., TCI state $ID_{i,1}$) mapped to codepoint i of the TCI field of DCI, and the additional TCI state TCI state $ID_{i,2}$ is not present in the MAC CE. If $C_i$ field is set to 1, then there are 2 TCI states (i.e., TCI state $ID_{i,1}$ and TCI state $ID_{i,2}$) mapped to codepoint i of the TCI field of DCI, and the additional TCI state TCI state $ID_{i,2}$ is present in the MAC CE. According to Table 6.2.1-1 of 3GPP TS 38.321 V16.2.1, the logical channel ID (LCID) corresponding to this MAC CE is 46.

1.4.2 Default TCI State Definitions in NR Rel-15

In NR Rel-15, a threshold timeDurationForQCL is reported by the UE based on the UE's capability. In the scheduling DCI, the UE may receive an indication of the TCI state and an indication of the time offset between the reception of the DL DCI and the corresponding PDSCH.

If the TCI state is indicated in DCI scheduling the PDSCH, the UE uses the indicated TCI state for determining the PDSCH DMRS antenna ports' quasi co-location when the time offset between the reception of the DL DCI and the corresponding PDSCH is equal to greater than the threshold timeDurationForQCL.

If the time offset between the reception of the DL DCI and the corresponding PDSCH is less than the threshold timeDurationForQCL, the UE may assume that the PDSCH DMRS antenna port(s) are quasi-collocated with the RS(s) with respect to the QCL parameter(s) used for PDCCH quasi co-location indication of the CORESET associated with a monitored search space with the lowest CORESET-ID in the latest slot. This assumption of quasi-collocation with the RS(s) of the CORESET with the lowest CORESET-ID is referred to as 'default TCI state' in this disclosure.

If none of configured TCI states for the serving cell of scheduled PDSCH contains 'QCL-TypeD', the UE shall obtain the other QCL assumptions from the TCI states indicated by DCI for its scheduled PDSCH irrespective of the time offset between the reception of the DL DCI and the corresponding PDSCH.

1.4.3 Default TCI State(s) Definitions in NR Rel-16

In NR Rel-16, default TCI states for single-DCI based multi-TRP PDSCH transmission are defined.

For single-DCI based multi-TRP PDSCH transmission scheme, two default TCI states are defined. Each of the two default TCI states corresponds to a different TRP. In 3GPP TS 38.214 V16.3.0, the two default TCI states for single-DCI based multi-TRP PDSCH transmission scheme are defined as follows:

if the offset between the reception of the DL DCI and the corresponding PDSCH is less than the threshold timeDurationForQCL and at least one configured TCI state for the serving cell of scheduled PDSCH contains the 'QCL-TypeD',

. . .

If a UE is configured with enableTwoDefaultT-CIStates-r16, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states . . . .

FIG. 7 shows an example of the default TCI states for a given codepoint of TCI field to TCI state mapping. In this example, the lowest codepoint that contains two different TCI states is codepoint 1. Hence, the default TCI states for single-DCI based multi-TRP PDSCH schemes in this example is given by the TCI states with IDs 2 and 3.

SUMMARY

Embodiments for implicitly updating one or several activated Transmission Configuration Indicator (TCI) states for a wireless communication device (e.g., User Equipment (UE)) based on a new radio base station (gNB) beam sweep report signaled from the wireless communication device and the gNB are disclosed.

In one embodiment, a method performed by the wireless communication device for implicit Transmission Configuration Indicator (TCI) state activation comprises sending a measurement report for one or more reference signals to a base station. The one or more reference signals is related to one or more TCI states, respectively. The method further comprises activating at least one TCI state from among the one or more TCI states that are related to the one or more reference signals. By this way, the TCI state selection is expedited and simplified, because the additional Medium Access Control (MAC) Control Element (CE) activation message is avoided.

In one embodiment, the at least one TCI state is only activated and applied in a case that the base station sends an acknowledgment, either via MAC CE or Downlink Control Information (DCI).

In one embodiment, a list of activated TCI states is configured for the wireless communication device and a number (M) of entries in the list are reserved for implicit TCI state activation.

In one embodiment, a number (N) of entries in the list are reserved for explicit TCI state activation.

In one embodiment, M is greater than or equal to 1, and N is greater than M.

In one embodiment, a set of codepoints for a DCI field used for TCI state selection comprises a number (M) of codepoints that are reserved for implicitly activated TCI states and a number (N) of codepoints that are reserved for explicitly updated TCI states.

In one embodiment, a value of N and/or a value of M is predefined.

In one embodiment, a value of N and/or a value of M is configured.

In one embodiment, the M codepoints that are reserved for implicit TCI activation are the first M codepoints in the set of codepoints for the DCI field.

In one embodiment, the M codepoints that are reserved for implicit TCI activation are the last M codepoints in the set of codepoints for the DCI field.

In one embodiment, receiving a MAC CE to update the TCI states, and updating only those TCI states that correspond to the codepoints of the DCI field that are reserved for explicit TCI state activation.

In one embodiment, receiving a DCI comprising the DCI field for explicit TCI state activation, and updating only those TCI states that correspond to the codepoints in the DCI field of the received DCI that are reserved for explicit TCI state activation.

In one embodiment, M=1 and the codepoint reserved for implicit TCI state activation is the same codepoint from one occasion of implicit TCI state activation to another.

In one embodiment, M is greater than or equal to 2, and the at least one TCI state activated is a single TCI state such that the M codepoints reserved for implicit TCI state activation represent the single TCI state and up to M−1 previously activated TCI states.

In one embodiment, each codepoint can be mapped to one or more TCI states.

In one embodiment, activating the at least one TCI state comprises determining that the at least one TCI state is not already activated for the wireless communication device and activating the at least one TCI state responsive to determining that the at least one TCI state is not already activated for the wireless communication device.

In one embodiment, activating the at least one TCI state comprises activating the at least one TCI state even if the at least one TCI state is already activated for the wireless communication device.

In one embodiment, a list of TCI states for which implicit TCI state activation is applicable is configured.

In one embodiment, relations between reference signals and TCI states are explicitly defined or configured.

In one embodiment, receiving an acknowledgement from the base station wherein activating the at least one TCI state comprises activating the at least one TCI state responsive to receiving the acknowledgment.

In one embodiment, the acknowledgment is received from the base station via either MAC CE or DCI.

In one embodiment, the acknowledgment comprises information that indicates at least one reference signal from the measurement report that is related to the at least one TCI state that is to be activated.

In one embodiment, the acknowledgment comprises information that identifies the measurement report.

In one embodiment, the reference signals are Synchronization Signal Blocks (SSBs).

Corresponding embodiments of the methods performed by the wireless communication device are also disclosed.

In one embodiment, a wireless communication device is adapted to send a measurement report for one or more reference signals to a base station. The one or more reference signals are related to one or more TCI states, respectively. The wireless communication device is also adapted to activate at least one TCI state from among the one or more TCI states that are related to the one or more reference signals.

In one embodiment, a wireless communication device comprises one or more transmitters; one or more receivers; and processing circuitry associated with the one or more transmitters and the one or more receivers, the processing circuitry configured to cause the wireless communication device to: send a measurement report for one or more reference signals to a base station. The one or more reference signals are related to one or more TCI states, respectively. The processing circuitry is also configured to activate at least one TCI state from among the one or more TCI states that are related to the one or more reference signals.

A method performed by a base station comprises receiving a measurement report for one or more reference signals from a wireless communication device. The one or more reference signals are related to one or more TCI states, respectively. The method further comprises activating at least one TCI state from among the one or more TCI states that are related to the one or more reference signals.

Corresponding embodiments of the methods performed by the base station are also disclosed.

In one embodiment, a base station is adapted to receive a measurement report for one or more reference signals from a wireless communication device. The one or more reference signals are related to one or more TCI states, respectively. The base station is further adapted to activate at least one TCI state from among the one or more TCI states that are related to the one or more reference signals.

In one embodiment, a base station comprises processing circuitry configured to cause the base station to receive a measurement report for one or more reference signals from a wireless communication device. The one or more reference signals are related to one or more TCI states, respectively. The processing circuitry is further configured to activate at least one TCI state from among the one or more TCI states that are related to the one or more reference signals.

BRIEF DESCRIPTION OF THE DRAWINGS

The accompanying drawing figures incorporated in and forming a part of this specification illustrate several aspects of the disclosure, and together with the description serve to explain the principles of the disclosure. Optional features are represented by dashed boxes.

FIG. 1 illustrates the Transmission Configuration Indicator (TCI) state information element.

FIG. 10 illustrates an example of a list of TCI states that may be considered for implicit update of activated TCI states in accordance with some of the embodiments.

FIG. 11 illustrates an example of a list of TCI states that may be considered for implicit update of activated TCI states as well as an explicit association between the reported Synchronization Signal Block (SSB) and the TCI state that may be activated in accordance with some of the embodiments.

FIG. 12 illustrates an example of a list of TCI states that may be considered for implicit update of activated TCI states as well as an explicit association between the reported SSB and the TCI state that may be activated in accordance with some of the embodiments.

DETAILED DESCRIPTION

Figure 2:
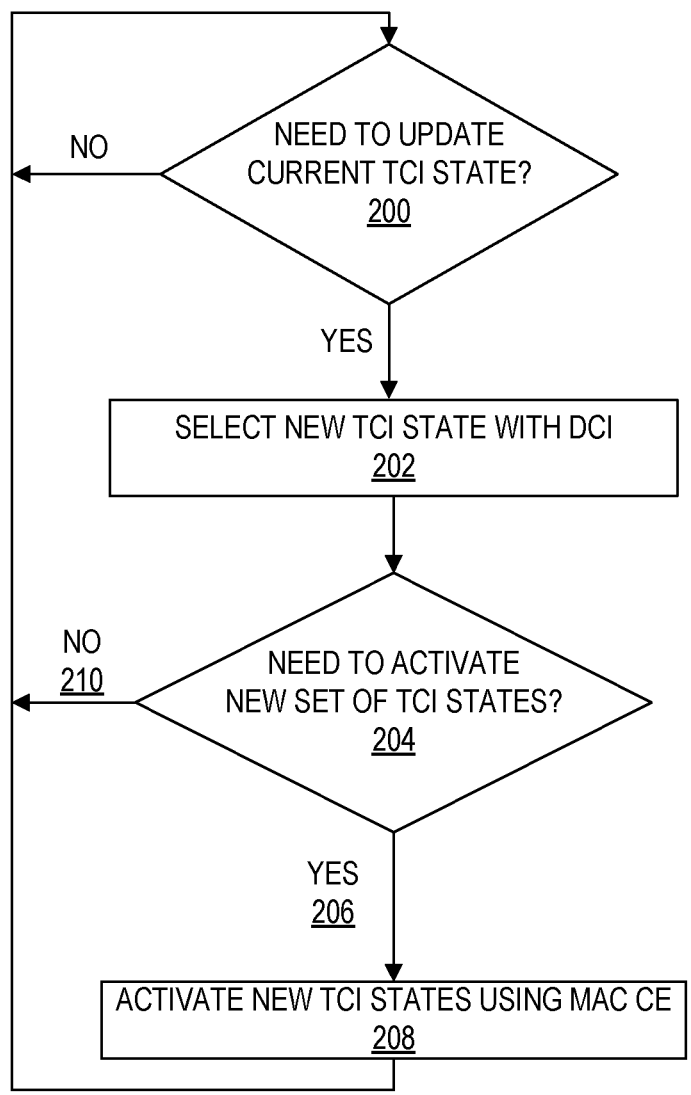
FIG. 2 illustrates the two-step procedure related to TCI state update.
Figure 3:
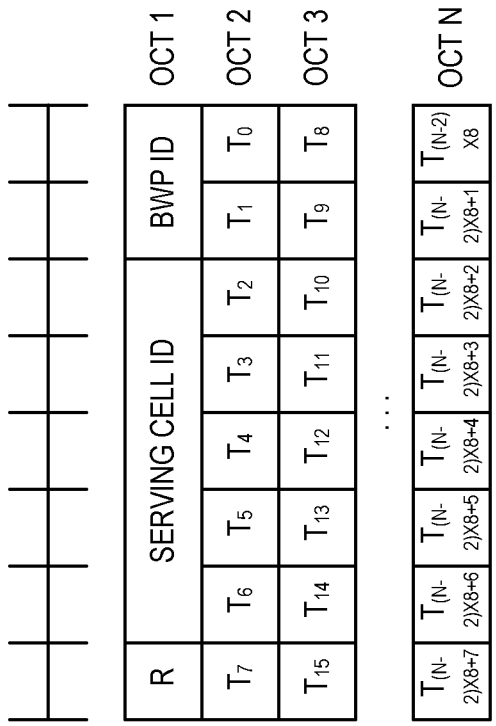
FIG. 3 illustrates the structure of the Medium Access Control (MAC) Control Element (CE) for activating/deactivating TCI states for UE specific Physical Downlink Shared Channel (PDSCH).
Figure 4:
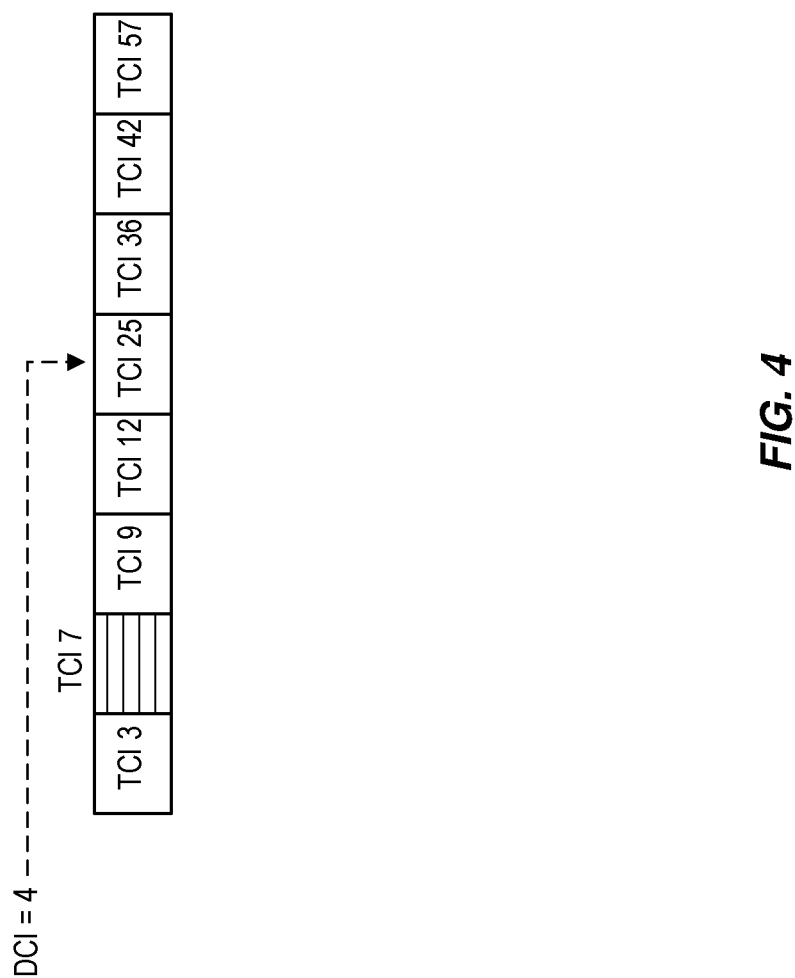
FIG. 4 illustrates one example where a base station indicates one of activated TCI states to a User Equipment (UE) by using Downlink Control Information (DCI).
Figure 5:
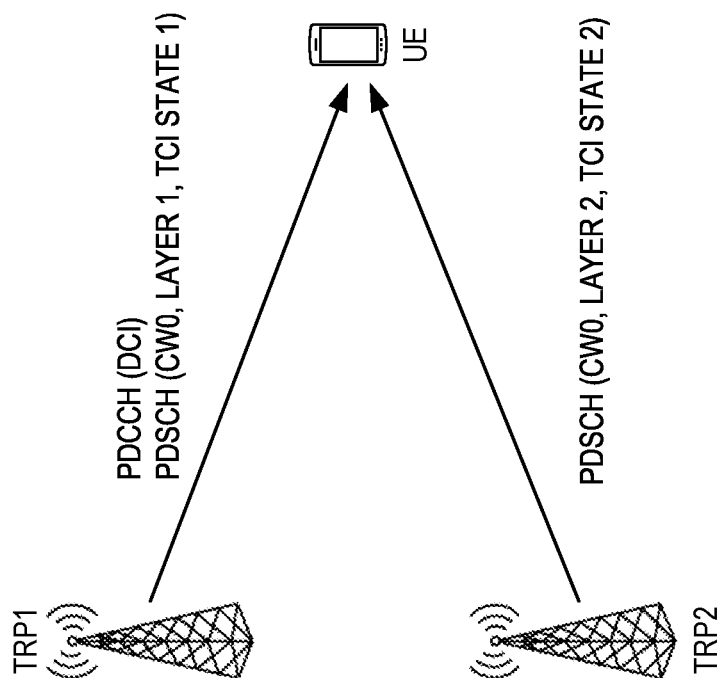
FIG. 5 illustrates one example of Physical Downlink Shared Channel (PDSCH) transmission over two Transmission/Reception Points (TRPs) using a single DCI.
Figure 6:
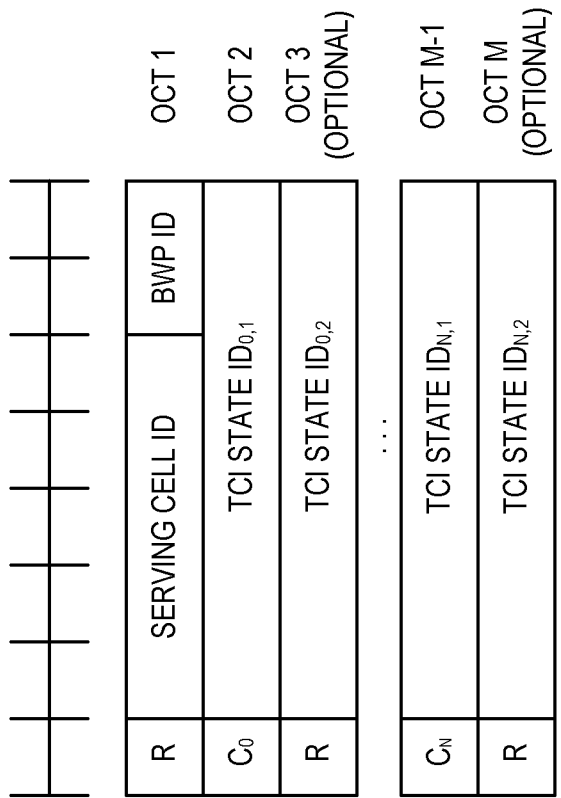
FIG. 6 illustrates the enhanced TCI States Activation/Deactivation PDSCH MAC CE for Single Downlink Control Information (DCI) based PDSCH Multi-TRP transmission.
Figure 7:
FIG. 7 illustrates the default TCI states for single-DCI based PDSCH multi-TRP transmission.

There currently exist certain challenge(s). In prior art, one Transmission Configuration Indicator (TCI) state is selected from the currently activated TCI states using Downlink Control Information (DCI) for Physical Downlink Shared Channel (PDSCH). The list of activated TCI states is updated using Medium Access Control (MAC) Control Element (CE). This means that both DCI and MAC CE will be needed (i.e., two-stage TCI state update as shown in FIG. 2). However, relying on MAC CE to activate TCI state may result in notable activation delay which may not be suitable for scenarios involving fast beam updates (i.e., fast TCI state update). Such scenarios involve high speed wireless communication devices 812 (e.g., User Equipments (UEs)) and deployment with large number of narrow beams. Hence, a problem that needs to be solved is how to make beam update (e.g., TCI updates) faster.

One way to mitigate the problem of latency due to the explicit signaling of a new TCI state is to let the UE implicitly update the TCI state based on, for example, a reported Channel State Information Reference Signal (CSI-RS) resource index or Synchronization Signal Block (SSB) index during a gNB beam sweep procedure. One disclosed solution like this provides that the spatial Quasi Co-Located (QCL) assumption at the wireless communication device 812 (e.g., UE) is implicitly determined based on the strongest reported gNB beam during a gNB beam sweep. However, this solution was not adopted in the NR specification. One reason for this was that the gNB beam selection becomes 'wireless communication device'-centric, i.e. it is the wireless communication device 812 that decides which gNB beam that should be used based on what the wireless communication device 812 reports.

Certain aspects of the present disclosure and their embodiments may provide solutions to the aforementioned or other challenges. In one embodiment, one or several of the activated TCI states for a wireless communication device 812 are implicitly updated based on measurement report signaled from the wireless communication device 812 to the base station (e.g., gNB). In one embodiment, the measurement report is a gNB beam sweep report signaled from the wireless communication device 812 to the gNB.

Note that compared to previous implicit TCI state updates (as for example the one described in the previous solution described above), the base station does not have to follow the wireless communication device 812 recommendation in this case since the measurement report (e.g., the gNB beam report) only will activate x out of N (where x<N) TCI states. If the base station does not want to switch to the best reported beam for the wireless communication device 812 (i.e., the last activated TCI state(s)), the base station can select one of the other activated TCI states. As such, the solution proposed herein is not a "wireless communication device centric" TCI state selection procedure but rather a "wireless communication device aided" TCI state selection procedure, which is more attractive and is more likely to be included in future 3GPP specification.

In a preferred embodiment, TCI states corresponding to reference signals reported in a measurement report become activated. The activation may happen when the wireless communication device 812 sends the report or a certain time after the report has been sent. There are, proposed herein, various embodiments which address one or more of the issues disclosed herein.

Certain embodiments may provide one or more of the following technical advantage(s). Embodiments of the solution disclosed herein may speed up and simplify the TCI state selection, because the additional MAC CE activation message may be avoided.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 8:
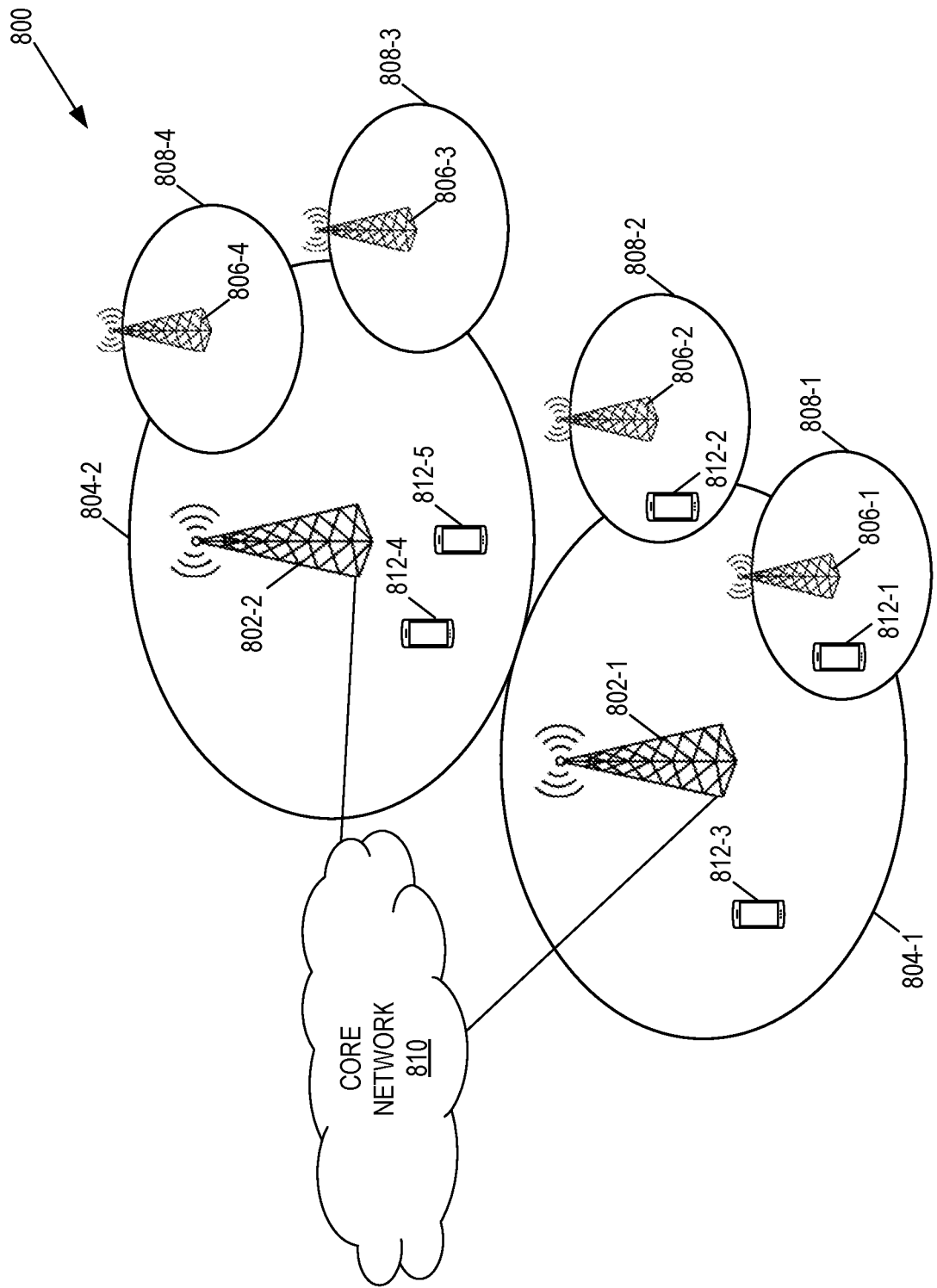
FIG. 8 illustrates one example of a cellular communications system in accordance with the embodiments in the present disclosure.

FIG. 8 illustrates one example of a cellular communications system 800 in which embodiments of the present disclosure may be implemented. In the embodiments described herein, the cellular communications system 800 is a 5G system (5GS) including a Next Generation RAN (NG-RAN) and a 5G Core (5GC); however, the solutions disclosed herein are not limited thereto. In this example, the RAN includes base stations 802-1 and 802-2, which in the 5GS include NR base stations (gNBs) and optionally next generation eNBs (ng-eNBs) (e.g., LTE RAN nodes connected to the 5GC), controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The RAN may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5G System (5GS) is referred to as the 5GC. The base stations 802 (and optionally the low power nodes 806) are connected to the core network 810.

The base stations 802 and the low power nodes 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs and as such are sometimes referred to as UEs 812, but the present disclosure is not limited thereto.

Embodiments of the present disclosure will now be described.

In one embodiment, one or more TCI states corresponding to one or more reference signals reported in a measurement report become activated. The activation may happen when the wireless communication device 812 sends the report or a certain time after the report has been sent.

Figure 9:
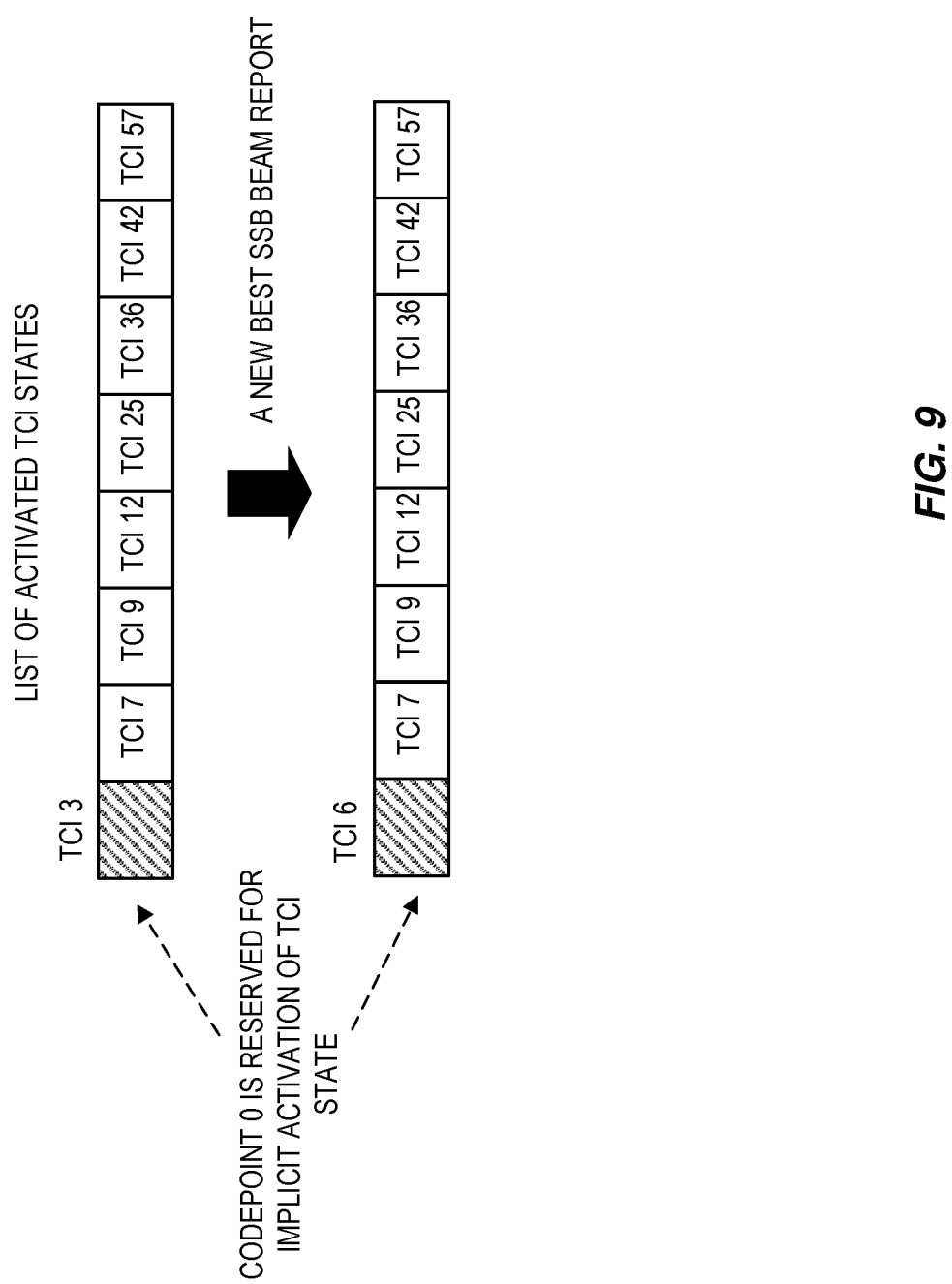
FIG. 9 illustrates a first example embodiment of implicit update of the TCI states and related mappings to codepoints in the TCI field of the DCI.

In one embodiment, a wireless communication device 812 has been configured with a list of a number (N) of explicitly activated TCI states, and a number (M) of implicitly activated TCI states. In one example N=7 and M=1, which means that 7 out of 8 activated TCI states are explicitly activated (e.g., using RRC/MAC-CE such as, e.g., using the two-step activation procedure of FIG. 2), while one out of eight activated TCI states are implicitly updated. In one embodiment, the first M DCI codepoints are reserved for implicit TCI state activation update. For example, for M=1, the TCI state corresponding to codepoint 0 in the TCI field of a DCI format (which may be either a DL DCI with formats 1_1/1_2, or a UL DCI with formats 0_1/0_2) is reserved for implicitly updated activation of a TCI state, as schematically illustrated in FIG. 9. In this case, an SSB beam report is received by the gNB with a new best SSB beam. In this example, the new best SSB beam is "directly" or "indirectly" related to TCI State 6; hence, the codepoint 0 of the list of activated TCI states is updated from TCI state 3 to TCI state 6. It is then up to the gNB if it would like to switch the gNB beam to the new best reported SSB beam by signaling codepoint 0 in a TCI field in a DCI. In another embodiment, the last M DCI codepoints are reserved for implicit TCI state activation update. With this mapping, the explicitly activated TCI states can be activated using state-of-the-art mechanisms, i.e., MAC CE.

In one embodiment, the list of activated TCI states is updated implicitly only if the best reported RSs are associated with TCI states that are currently inactive. In another embodiment, the list of activated TCI states is updated implicitly even for reported RSs that are associated with TCI states that are already active.

In one embodiment, which codepoints in the TCI field of a DCI are reserved for implicit TCI state update are pre-defined in 3GPP specifications. In an alternative embodiment, which codepoints in the TCI field of a DCI are reserved for implicit TCI state update are signaled by the gNB to the wireless communication device 812 via higher layer configuration (e.g., via RRC). In one particular variant of this embodiment, which codepoints in the TCI field of a DCI are reserved for implicit TCI state update are configured as part of the ControlResourceSet information element (IE) given in 3GPP TS 38.331. In some further embodiments, which codepoints in the TCI field of a DCI are reserved for implicit TCI state update are optionally configured under the condition that the TCI field is enabled in DCI. In another embodiment, how many codepoints in the TCI field of a DCI are reserved for implicit TCI state update starting from either the last codepoint or the first codepoint are signaled to the wireless communication device 812.

In one embodiment, when the wireless communication device 812 receives a MAC CE to update the TCI states, the wireless communication device 812 only updates the TCI states corresponding to the TCI codepoints of the TCI field that are to be explicitly updated. If the MAC CE provides a TCI state update corresponding to a TCI field codepoint that is reserved for implicit TCI state update, then the wireless communication device 812 ignores this TCI state update. In other words, the TCI state update provided by the MAC CE does not override the TCI state(s) of TCI field codepoint that is reserved for implicit TCI state update.

In the previous embodiment illustrated in FIG. 9, a TCI state is implicitly activated in case a TCI state is "directly" or "indirectly" spatially related to an SSB that is included in a beam report as best reported beam and where that TCI state is not already in the activated TCI state list. However, in some cases there might be several TCI states that are "directly" or "indirectly" spatially related to an SSB which could lead to ambiguity regarding which TCI state to activate.

Hence, in one embodiment, an explicit list of TCI states is configured for which the implicit TCI state activation update is applicable to, as illustrated in FIG. 10. For each TCI state in the list in FIG. 10, there should be a clear association with one single SSB in order to remove the ambiguity. In other words, the wireless communication device 812 only considers the TCI states in this list when mapping the SSB to a TCI state index.

The explicit list can also be extended to carrier aggregation applications, such that TCI states configured for other serving cells than the serving cell of the SSB also are implicitly updated. An example of this can be seen in the right table of FIG. 10, where the corresponding serving cells that the implicit TCI state update should be applied for are listed. So, in this example, assume that the wireless communication device 812 reports a new best SSB beam 6 which corresponds to a TCI state 4 in all serving cells. Assume further that TCI state 4 is not among the already activated TCI states in any of the serving cells. Then the list of activated TCI states for all serving cells will be updated to also include TCI state 4.

In one embodiment, the relation between SSBs and TCI states are explicitly associated (instead of using the implicit association based on "direct" or "indirect" spatial relation as described above), as illustrated in FIG. 11.

It is also possible to make an even more detailed association between TCI states and SSBs by, for example, indicating the serving cell(s) for each TCI state and SSB, an example of which is illustrated in FIG. 12. Note that all illustration in FIG. 10 to 12 are just examples to facilitate the description of the proposed embodiments and should not be seen as limiting.

In one embodiment, the implicitly updated TCI state(s) always are mapped to one single codepoint, for example codepoint 0. This means that the implicitly activated TCI state only will be active until another TCI state becomes implicitly activated.

Figure 13:
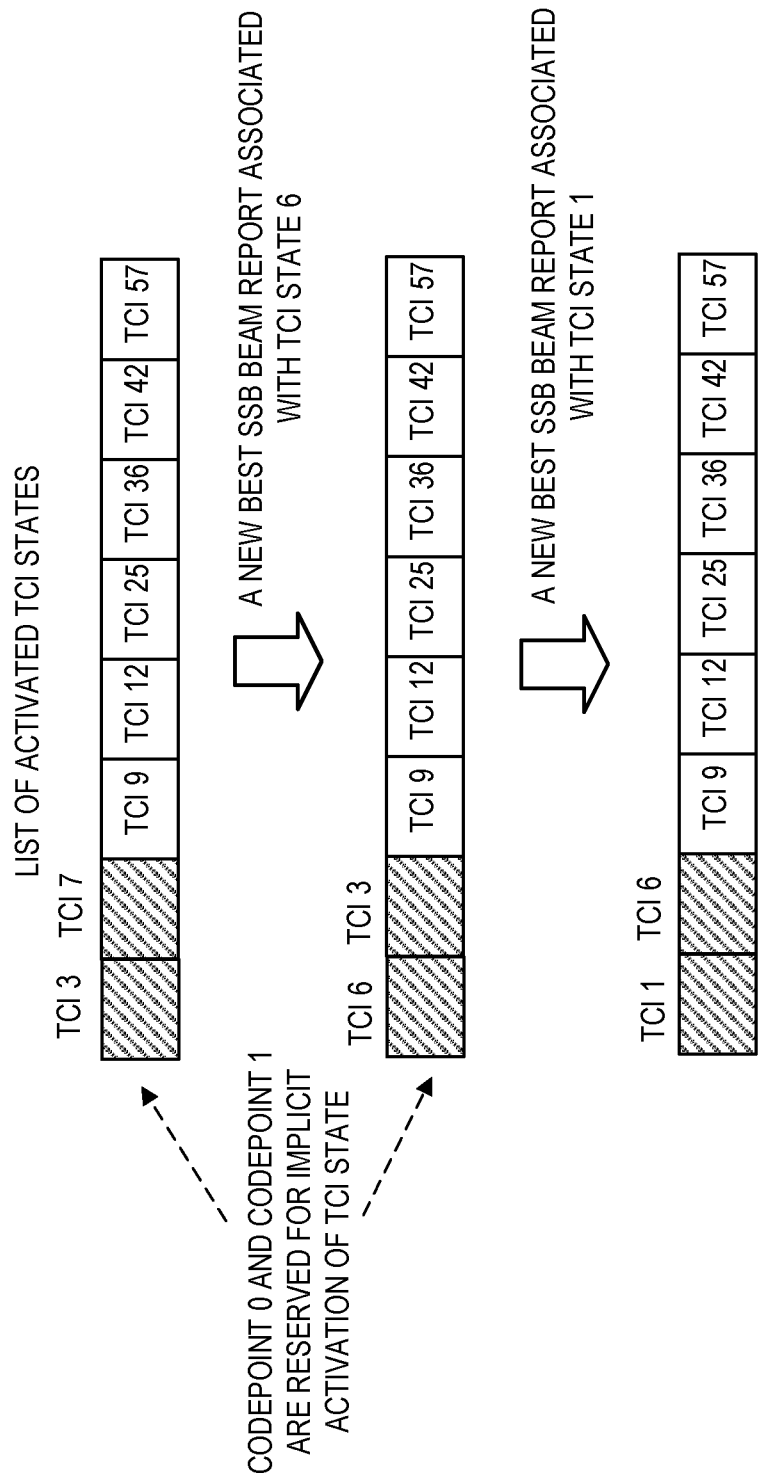
FIG. 13 illustrates an example where codepoints 0 and 1 in the TCI field in DCI are reserved for implicit update in accordance with some of the embodiments.

In one embodiment, two or more codepoints are reserved for implicitly activated TCI states (for example codepoint 0 and codepoint 1). In this way, for example, the last activated TCI state could become associated with codepoint 0, and the previously activated TCI state moves from codepoint 0 to codepoint 1 (which also means that the even older implicitly updated TCI state previously associated with codepoint 1 now is removed completely). One example of this is illustrated in FIG. 13.

Figure 14:
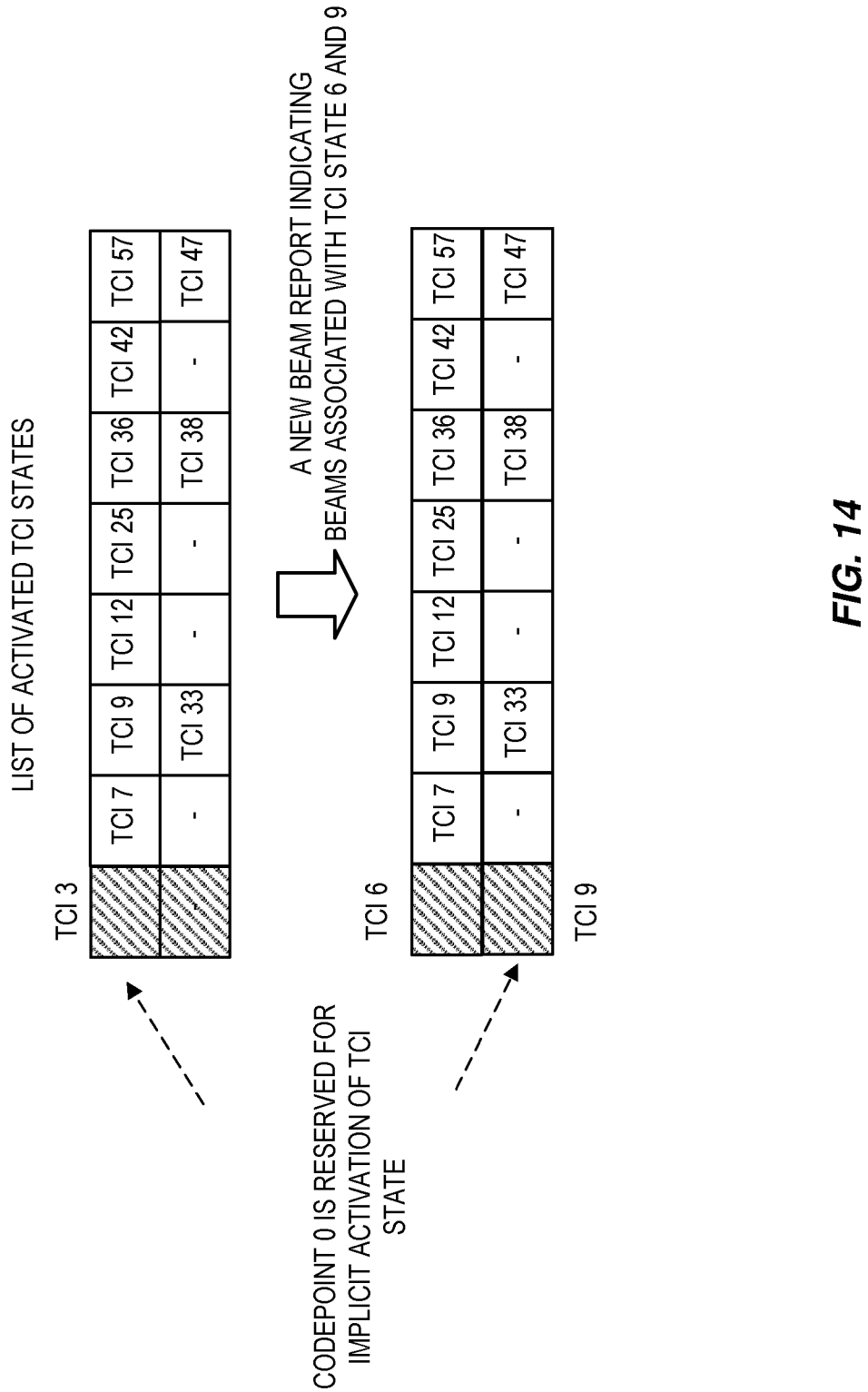
FIG. 14 illustrates an example where codepoint 0 in the TCI field in DCI is reserved for implicit update in accordance with some of the embodiments.

In another embodiment, the codepoint in the TCI field reserved for implicit updates is extended to the multi-TRP scenario where a codepoint can be mapped to two TCI states (each TCI state associated with one of the TRPs). An example of this embodiment is shown in FIG. 14 where codepoint 0 in the TCI field in DCI is reserved for implicit update. In this example, codepoint 0 is mapped to TCI state 3 initially. Then, the wireless communication device 812 sends a new beam report to the network where the beam report contains two beams associated with TCI states 6 and 9. Following the new beam report, TCI states 6 and 9 will be mapped to codepoint 0 implicitly. After the implicit update codepoint 0 can be used to schedule single PDCCH based multi-TRP transmission.

Figure 15:
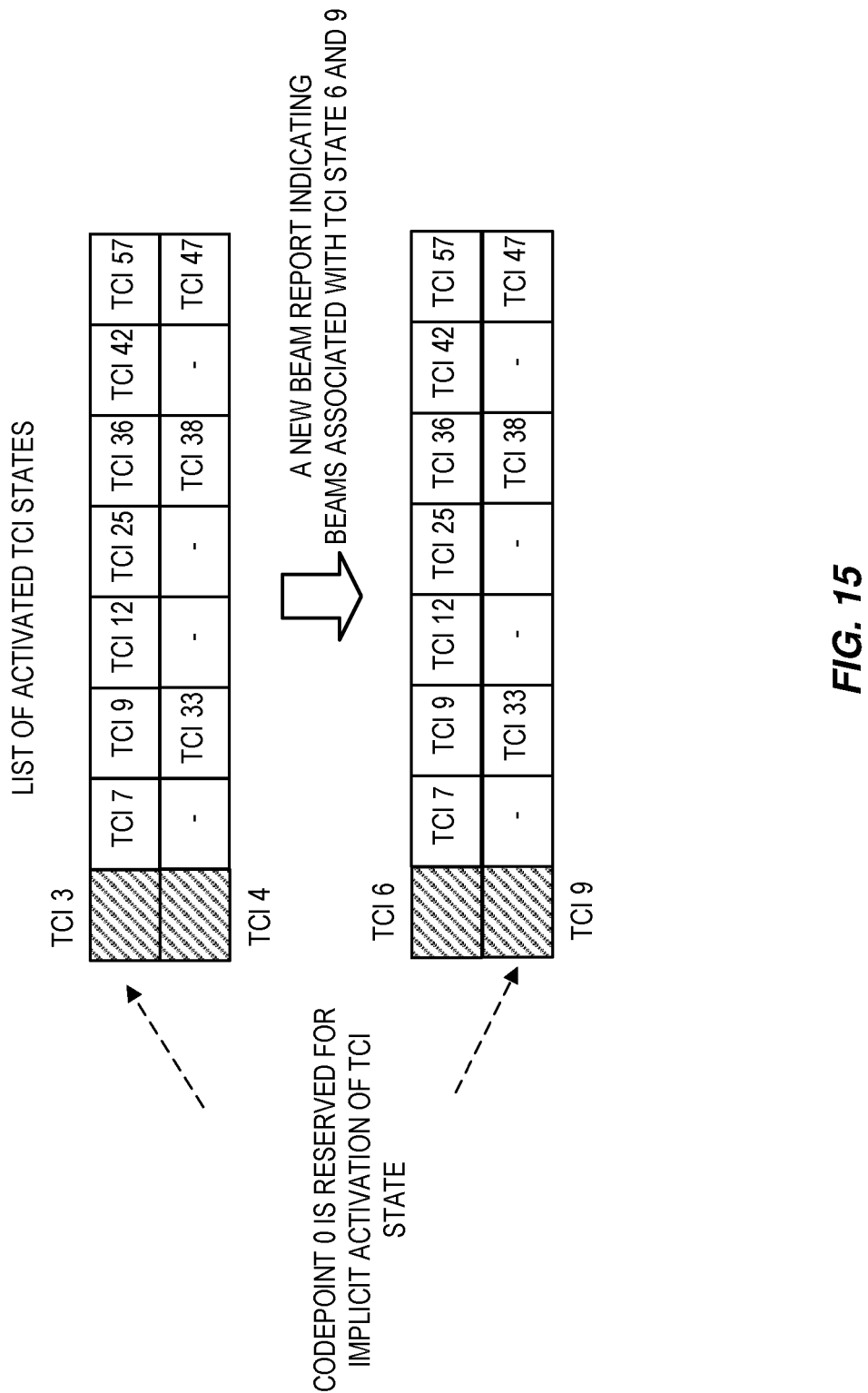
FIG. 15 illustrates an example of implicit update of TCI states and related mappings to codepoints in the TCI field in DCI in accordance with some of the embodiments.

Another example of this embodiment is shown in FIG. 15 where codepoint 0 in the TCI field in DCI is reserved for implicit update. In this example, codepoint 0 is mapped to TCI states 3 and 4 initially. Then, the wireless communication device 812 sends a new beam report to the network where the beam report contains two beams associated with TCI states 6 and 9. Following the new beam report, TCI states 6 and 9 will be mapped to codepoint 0 implicitly. After the implicit update codepoint 0 can be used to schedule single PDCCH based multi-TRP transmission.

Figure 16:
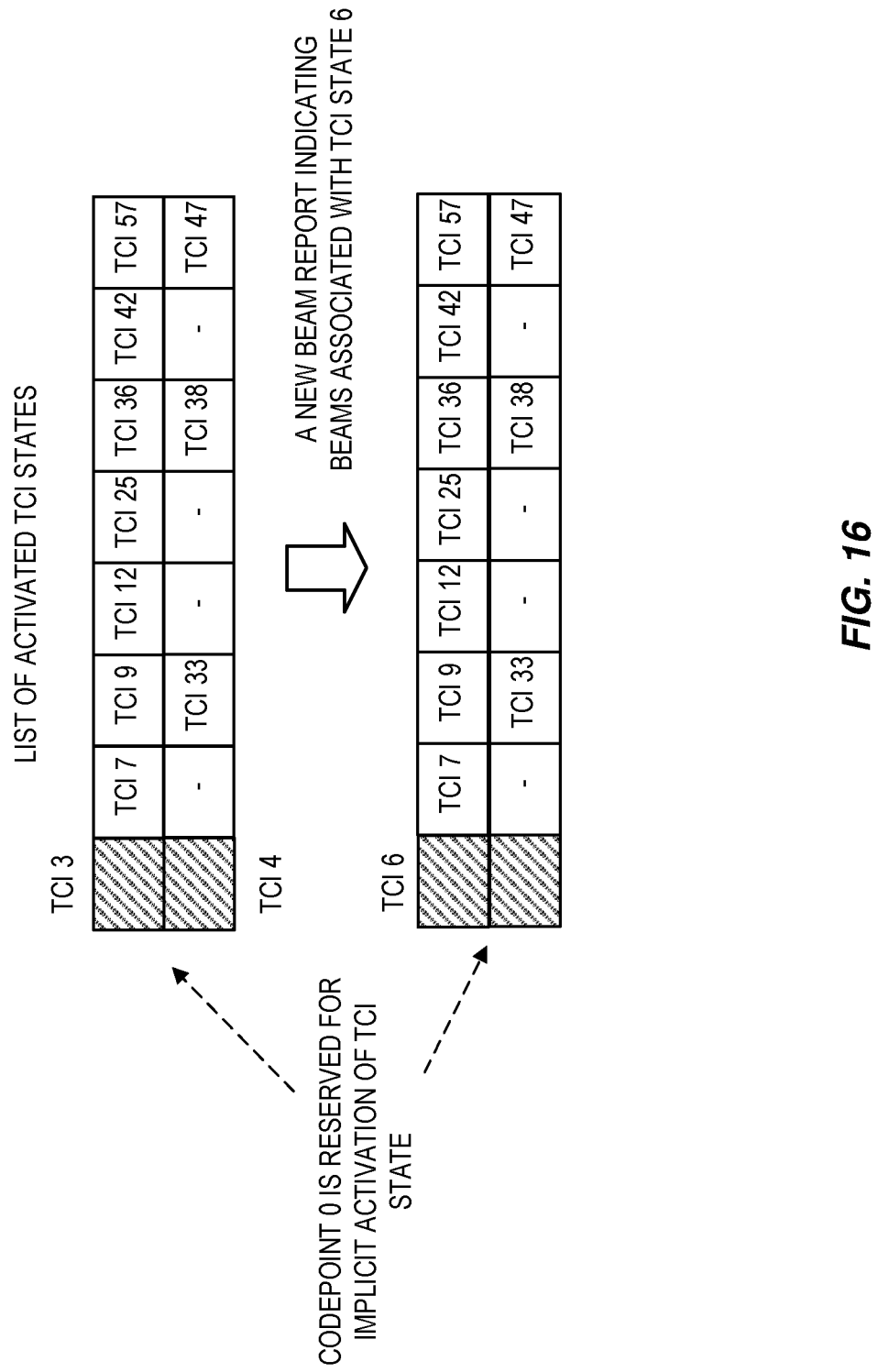
FIG. 16 illustrates an example of implicit update of TCI states and related mappings to codepoints in the TCI field in DCI in accordance with some of the embodiments.

Another example of this embodiment is shown in FIG. 16 where codepoint 0 in the TCI field in DCI is reserved for implicit update. In this example, codepoint 0 is mapped to TCI states 3 and 4 initially. Then, the wireless communication device 812 sends a new beam report to the network where the beam report contains a beam associated with TCI state 6. Following the new beam report, TCI state 6 will be mapped to codepoint 0 implicitly.

As described in Section 1.4.3 above, in NR Rel-16, default TCI state(s) for single-DCI based multi-TRP is given by the lowest TCI field codepoint mapped to 2 TCI states. However, reserving some codepoints for implicit update of TC states may impact the default TCI state definition. It may be beneficial for the gNB to have full control of the default TCI states. Hence, in one embodiment, when some TCI field codepoints are reserved for implicit update of TCI states, the default TCI state definition for single-DCI based multi-TRP is refined such that the lowest codepoint that is mapped to 2 TCI states excludes the reserved TCI field codepoints. This can be captured in 3GPP TS 38.214 V16.3.0 as follows:

if the offset between the reception of the DL DCI and the corresponding PDSCH is less than the threshold time-DurationForQCL and at least one configured TCI state for the serving cell of scheduled PDSCH contains the 'QCL-TypeD',
. . .
If a UE is configured with enableTwoDefaultT-CIStates-r16, and at least one TCI codepoint, excluding codepoints reserved for implicit TCI state update, indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints, excluding codepoints reserved for implicit TCI state update, containing two different TCI states . . . .

Figure 17:
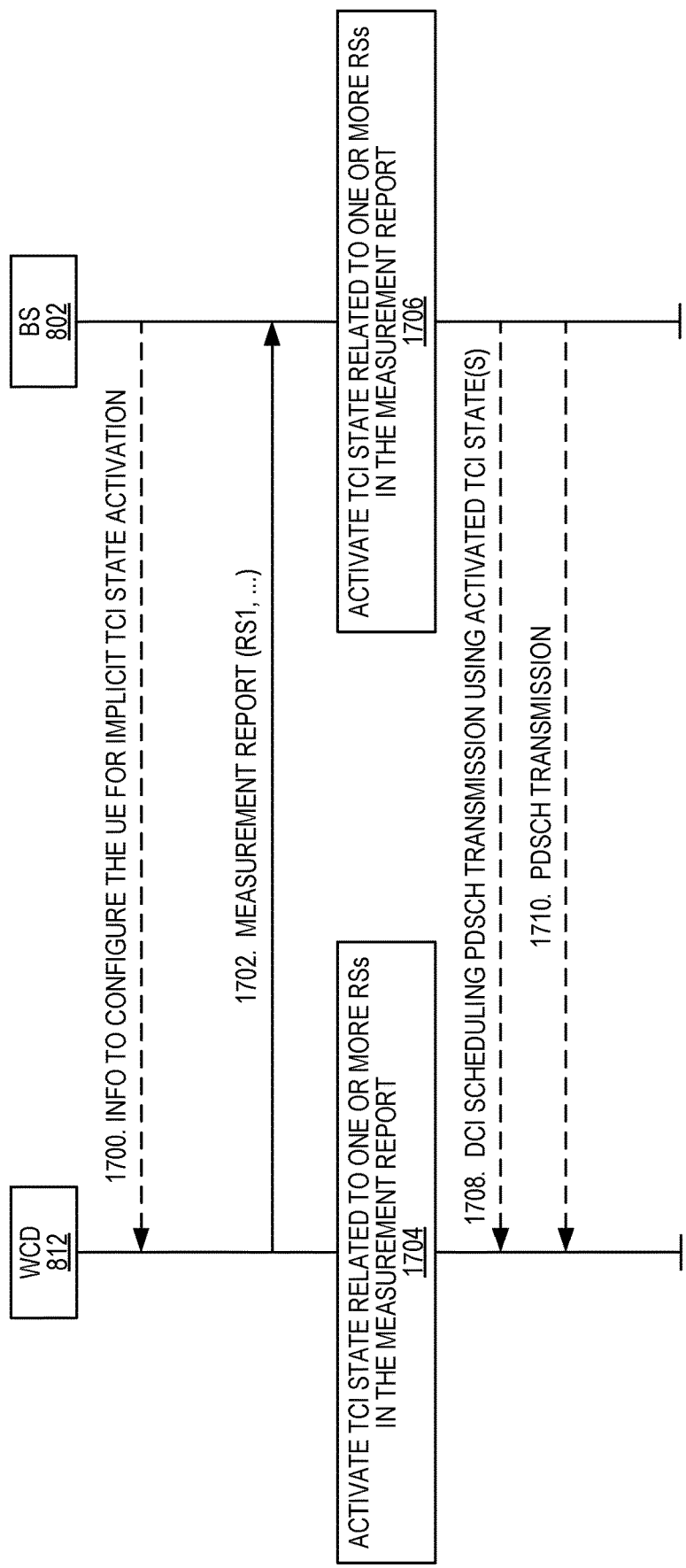
FIG. 17 illustrates one operation of a UE and a base station in accordance with some of the embodiments.

FIG. 17 illustrates the operation of a wireless communication device 812 and a base station 802 (e.g., gNB) in accordance with at least some of the embodiments described above. Optional steps are represented by dashed lines/boxes. As illustrated, the base station 802 may send, and the wireless communication device 812 receive, information that configures the wireless communication device 812 for implicit TCI state activation, as described above (step 1700). This information may include, for example, information that indicates the number (N) of explicitly activated TCI states, information that indicates the number (M) of implicitly activated TCI states, information that indicates which codepoint(s) is(are) reserved for implicit TCI state activation, and/or information that indicates which codepoint(s) are reserved for explicit TCI state activation.

The wireless communication device 812 generates and sends a measurement report to the base station 802 for one or more RSs that are related to one or more TCI states (step 1702). The RSs may, for example, be SSBs for SSB beams that are related to particular TCI states, as described above. Note that a RS may be explicitly related to a particular TCI state, e.g., via signaling from the network (e.g., signaling of a table to the wireless communication device 812 that indicates the associations between RSs and TCI states). Alternatively, a RS may be implicitly related to a particular TCI state. In other words, there may be an indirect association of a RS to a particular TCI state (e.g., when the RS is not directly used in the TCI state). A direct association between a RS and a TCI state may be when the RS is configured in the TCI state. Also note that, for the implicit association, a table may indicate which TCI state should be used for implicit update (however, there is no explicitly signaled association between the TCI states and the RSs; instead, direct or indirect association is assumed).

The wireless communication device 812 and the base station 802 then activate one or more TCI states based on the measurement report, in accordance with any of the embodiments described above (steps 1704 and 1706). The base station 802 may subsequently send a DCI to the wireless communication device 812 that schedules a PDSCH transmission to the wireless communication device 812 using a desired activated TCI state(s) (step 1708) and the PDSCH transmission is transmitted to the wireless communication device 812 and received by the wireless communication device 812 accordingly (step 1710). Note that while TCI state for PDSCH is used in this example embodiment, the embodiments are not limited thereto. The TCI state update procedure described herein may be used for additional or alternative channels (e.g., any channel that can have its TCI state updated via DCI) such as, e.g., PUSCH, SRS, PUCCH, CSI-RS, or the like. In one embodiment, the TCI state update procedure described herein (e.g., implicit updating of DCI based TCI state selection) is applicable to all or a subset of all downlink and/or uplink signals or channels.

Figure 18:
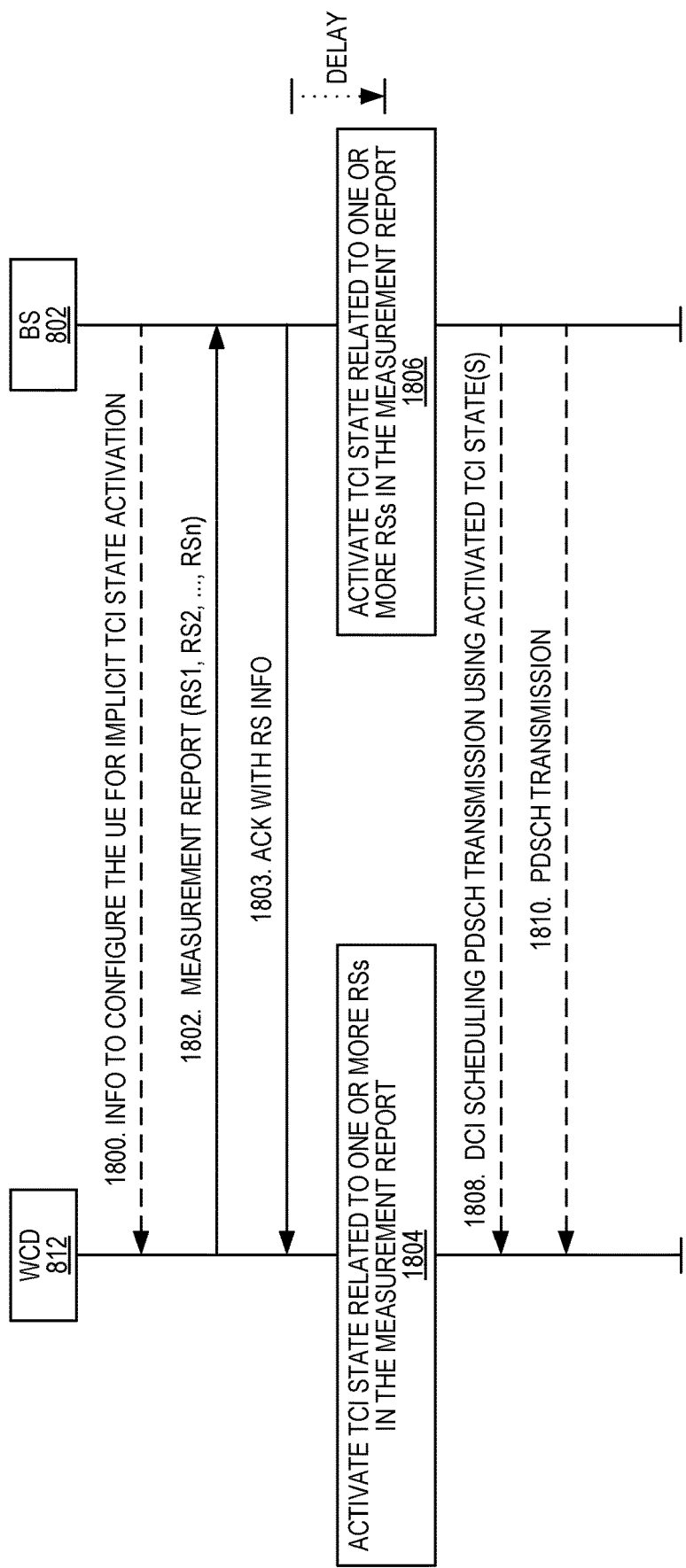
FIG. 18 illustrates another operation of the UE and the base station in accordance with some of the embodiments.

One issue that may arise with the proposed solution is that the measurement report may get lost. In this case, there will be an ambiguity in the set of activated TCI states—the wireless communication device 812 will activate a new set of TCI states, but the gNB will not. To solve this, the gNB may send an acknowledgement which includes information about which RSs are actually used to activate the corresponding TCI states. For example, if the wireless communication device 812 reports 4 SSBs, the acknowledgment may contain a 4-bit bitmap. If the first bit=1, the TCI state corresponding to the first reported RS is activated, and so on. In another embodiment, the acknowledgment contains the indices of the reported RSs. The procedure is illustrated in FIG. 18. As illustrated in FIG. 18, the base station 802 may send, and the wireless communication device 812 receive, information that configures the wireless communication device 812 for implicit TCI state activation, as described above (step 700). The wireless communication device 812 generates and sends a measurement report to the base station 802 for one or more RSs that are related to one or more TCI states (step 702). The RSs may, for example, be SSBs for SSB beams that are related to particular TCI states, as described above. Note that the measurement report includes information that indicates the reported RS(s)/SSB(s)/SSB beam(s) such as, e.g., an index(es) of the RS(s)/SSB(s)/SSB beam(s). The base station 802 sends an acknowledgment to the wireless communication device 812 that may include information that indicates the RS(s) from the measurement report for which the related TCI state(s) is(are) activated (step 703). The wireless communication device 812 and the base station 802 then activate the TCI state(s) (e.g., indicated by the ack), in accordance with any of the embodiments described above (steps 704 and 706). The base station 802 may subsequently send a DCI to the wireless communication device 812 that schedules a PDSCH transmission to the wireless communication device 812 using a desired activated TCI state(s) (step 708) and the PDSCH transmission is transmitted to the wireless communication device 812 and received by the wireless communication device 812 accordingly (step 710).

Figure 19:
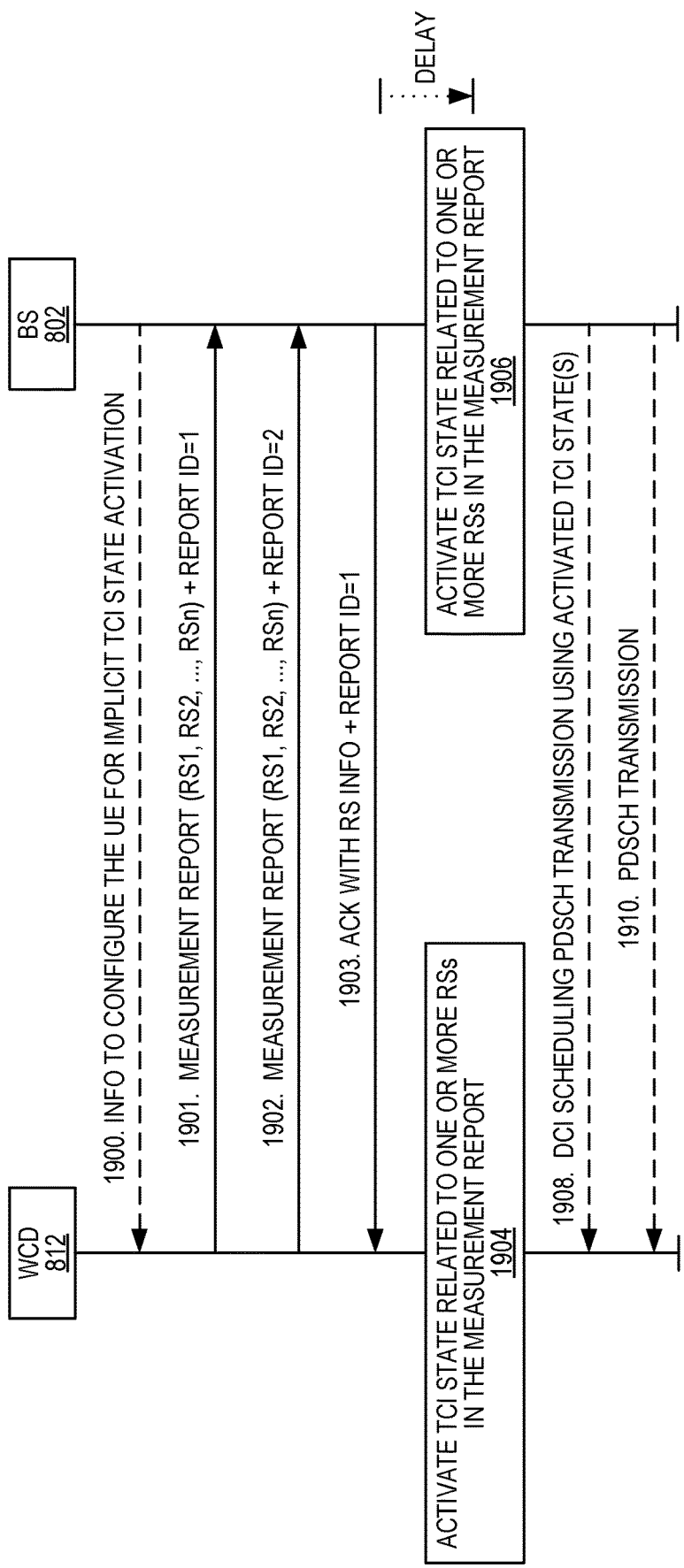
FIG. 19 illustrates another operation of the UE and the base station in accordance with some of the embodiments.

Even with the proposed acknowledgment, there may be an ambiguity to which report the acknowledgment is associated. For example, the gNB may request two measurement reports, and only afterwards decide which RS to activate. To solve this, a short report identity is included in each report, and the acknowledgment would contain this report identity together with the information about which RSs in the identified report are actually used to activate TCI states. This is illustrated in FIG. 19. As illustrated in FIG. 19, the base station 802 may send, and the wireless communication device 812 receive, information that configures the wireless communication device 812 for implicit TCI state activation, as described above (step 900). The wireless communication device 812 generates and sends, in this example, two measurement reports to the base station 802 for one or more RSs that are related to one or TCI states (steps 901 and 902). Each measurement report is associated to a respective report ID. The base station 802 sends an acknowledgment to the wireless communication device 812 that include the report ID of the report used to determine the TCI states to implicitly activate and, optionally, information that indicates the RS(s) from the indicated measurement report for which the related TCI state(s) is(are) activated (step 903). The wireless communication device 812 and the base station 802 then activate the TCI state(s) (e.g., indicated by the ack), in accordance with any of the embodiments described above (steps 904 and 906). The base station 802 may subsequently send a DCI to the wireless communication device 812 that schedules a PDSCH transmission to the wireless communication device 812 using a desired activated TCI state(s) (step 908) and the PDSCH transmission is transmitted to the wireless communication device 812 and received by the wireless communication device 812 accordingly (step 910).

Figure 20:
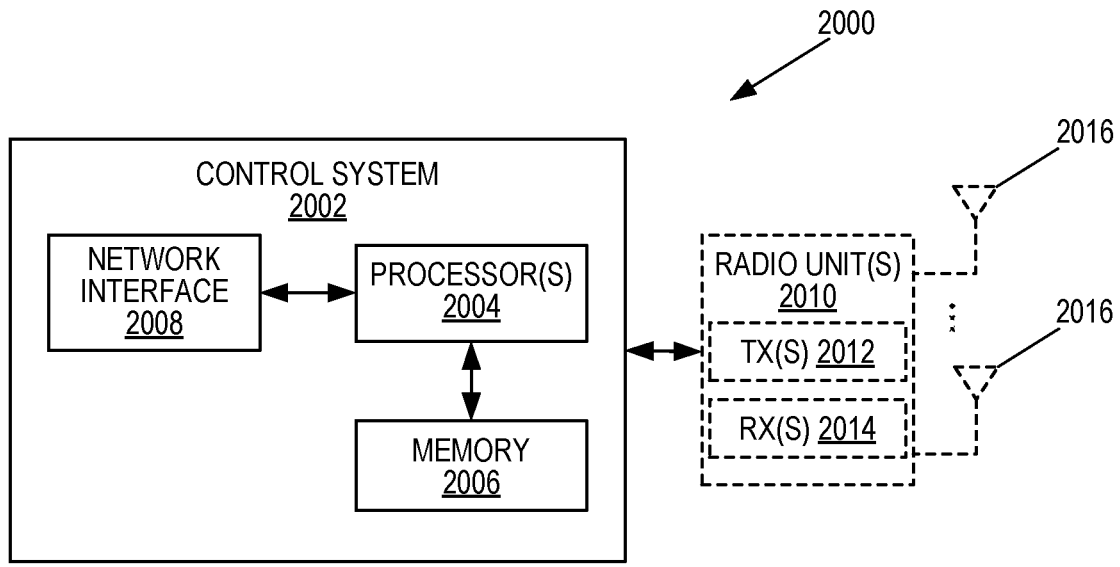
FIG. 20 illustrates a schematic block diagram of a network node according to some embodiments of the present disclosure.

FIG. 20 is a schematic block diagram of a network node 2000 according to some embodiments of the present disclosure. Optional features are represented by dashed boxes. The network node 2000 may be, for example, a base station 802 or 806 or a network node that implements all or part of the functionality of the base station 802 or gNB as described herein. As illustrated, the network node 2000 includes a control system 2002 that includes one or more processors 2004 (e.g., Central Processing Units (CPUs), Application Specific Integrated Circuits (ASICs), Field Programmable Gate Arrays (FPGAs), and/or the like), memory 2006, and a network interface 2008. The one or more processors 2004 are also referred to herein as processing circuitry. In addition, if the network node 2000 is a radio access node (e.g., a base station 802), the network node 2000 may include one or more radio units 2010 that each includes one or more transmitters 2012 and one or more receivers 2014 coupled to one or more antennas 2016. The radio units 2010 may be referred to or be part of radio interface circuitry. In some embodiments, the radio unit(s) 2010 is external to the control system 2002 and connected to the control system 2002 via, e.g., a wired connection (e.g., an optical cable). However, in some other embodiments, the radio unit(s) 2010 and potentially the antenna(s) 2016 are integrated together with the control system 2002. The one or more processors 2004 operate to provide one or more functions of the network node 2000 as described herein (e.g., one or more functions of the base station 802 or gNB, as described herein). In some embodiments, the function(s) are implemented in software that is stored, e.g., in the memory 2006 and executed by the one or more processors 2004.

Figure 21:
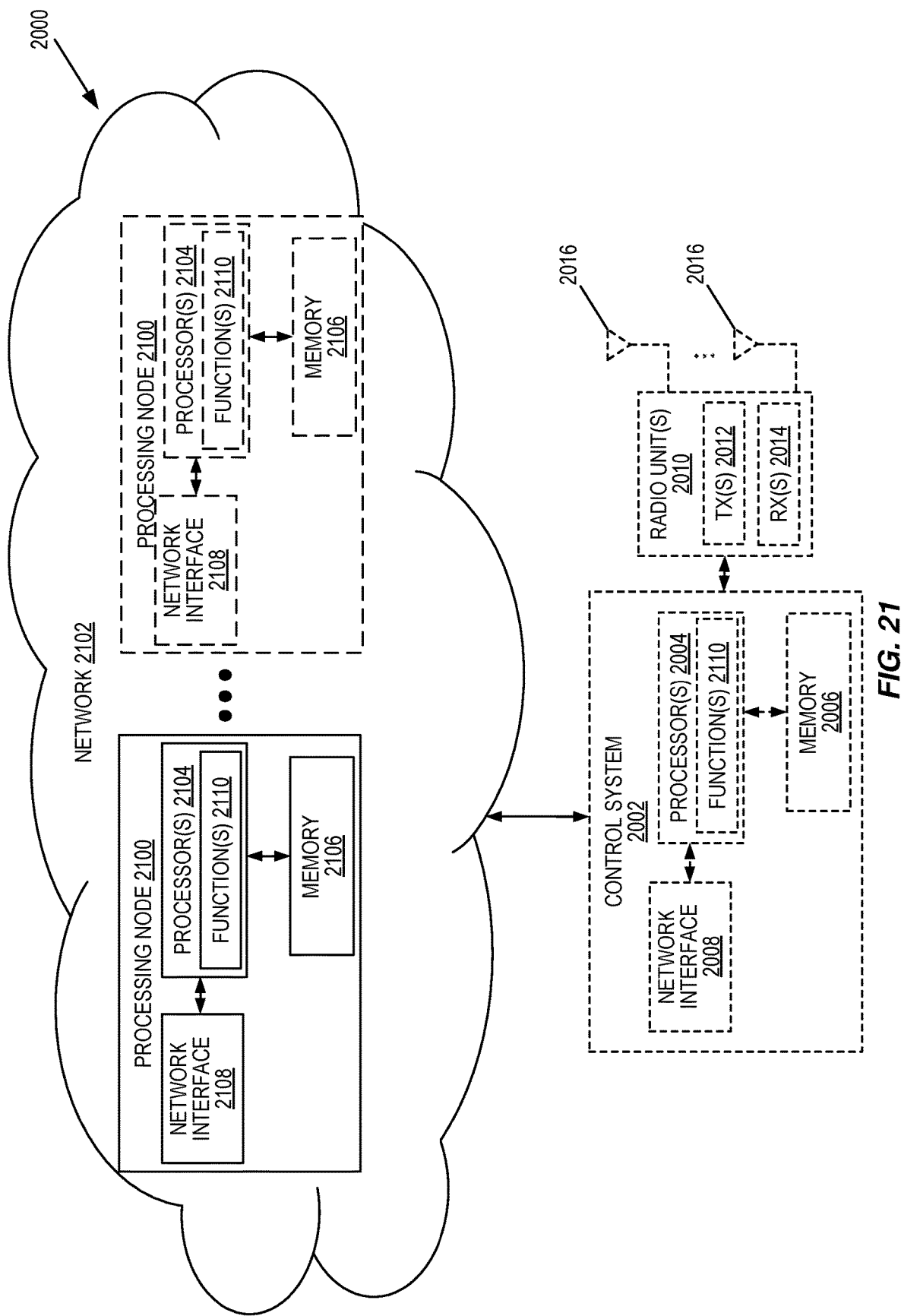
FIG. 21 illustrates a schematic block diagram that illustrates a virtualized embodiment of a network node according to some embodiments of the present disclosure.

FIG. 21 is a schematic block diagram that illustrates a virtualized embodiment of the network node 2000 according to some embodiments of the present disclosure. Again, optional features are represented by dashed boxes. As used herein, a "virtualized" network node is an implementation of the network node 2000 in which at least a portion of the functionality of the network node 2000 is implemented as a virtual component(s) (e.g., via a virtual machine(s) executing on a physical processing node(s) in a network(s)). As illustrated, in this example, the network node 2000 includes one or more processing nodes 2100 coupled to or included as part of a network(s) 2102. Each processing node 2100 includes one or more processors 2104 (e.g., CPUs, ASICs, FPGAs, and/or the like), memory 2106, and a network interface 2108. If the network node 2000 is a radio access node (e.g., a base station 802), the network node 2000 may include the control system 2002 and/or the one or more radio units 2010, as described above. The control system 2002 may be connected to the radio unit(s) 2010 via, for example, an optical cable or the like. If present, the control system 2002 or the radio unit(s) are connected to the processing node(s) 2100 via the network 2102.

In this example, functions 2110 of the network node 2000 described herein (e.g., one or more functions of the base station 802 or gNB, as described herein) are implemented at the one or more processing nodes 2100 or distributed across the one or more processing nodes 2100 and the control system 2002 and/or the radio unit(s) 2010 in any desired manner. In some particular embodiments, some or all of the functions 2110 of the network node 2000 described herein are implemented as virtual components executed by one or more virtual machines implemented in a virtual environment(s) hosted by the processing node(s) 2100. As will be appreciated by one of ordinary skill in the art, additional signaling or communication between the processing node(s) 2100 and the control system 2002 may be used in order to carry out at least some of the desired functions 2110. Notably, in some embodiments, the control system 2002 may not be included, in which case the radio unit(s) 2010 communicate directly with the processing node(s) 2100 via an appropriate network interface(s).

In some embodiments, a computer program including instructions which, when executed by at least one processor, causes the at least one processor to carry out the functionality of the network node 2000 or a node (e.g., a processing node 2100) implementing one or more of the functions 2110 of the network node 2000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
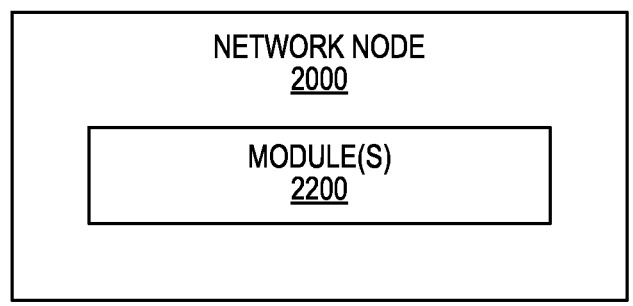
FIG. 22 illustrates a schematic block diagram of a network node according to some embodiments of the present disclosure.

FIG. 22 is a schematic block diagram of the network node 2000 according to some other embodiments of the present disclosure. The network node 2000 includes one or more modules 2200, each of which is implemented in software. The module(s) 2200 provide the functionality of the network node 2000 described herein (e.g., one or more functions of the base station 802 or gNB, as described herein). This discussion is equally applicable to the processing node 2100 of FIG. 21 where the modules 2200 may be implemented at one of the processing nodes 2100 or distributed across multiple processing nodes 2100 and/or distributed across the processing node(s) 2100 and the control system 2002.

Figure 23:
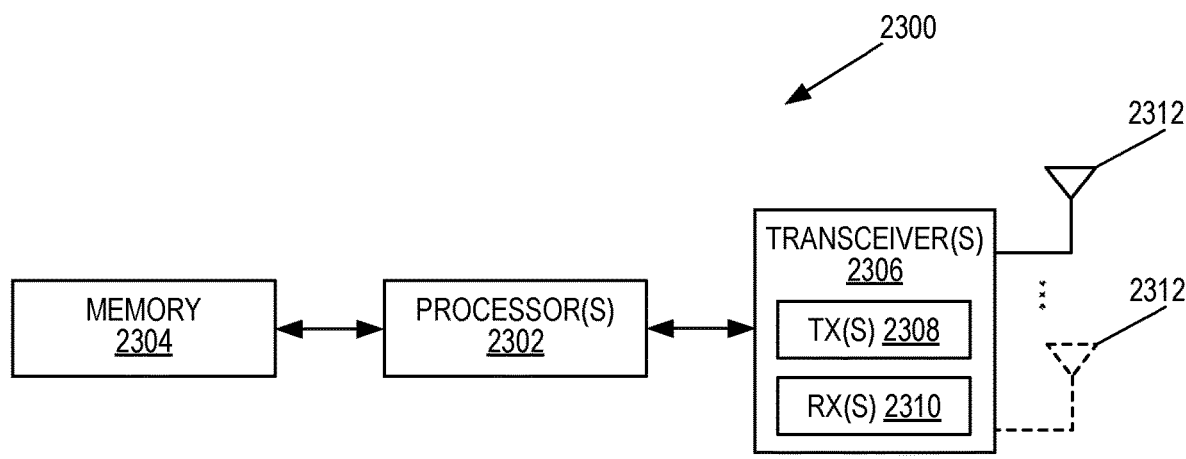
FIG. 23 illustrates a schematic block diagram of a wireless communication device according to some embodiments of the present disclosure.

FIG. 23 is a schematic block diagram of a wireless communication device 2300 (e.g., the wireless communication device 812 or a UE) according to some embodiments of the present disclosure. As illustrated, the wireless communication device 2300 includes one or more processors 2302 (e.g., CPUs, ASICs, FPGAs, and/or the like), memory 2304, and one or more transceivers 2306 each including one or more transmitters 2308 and one or more receivers 2310 coupled to one or more antennas 2312. The transceiver(s) 2306 includes radio-front end circuitry connected to the antenna(s) 2312 that is configured to condition signals communicated between the antenna(s) 2312 and the processor(s) 2302, as will be appreciated by on of ordinary skill in the art. The processors 2302 are also referred to herein as processing circuitry. The transceivers 2306 are also referred to herein as radio circuitry. In some embodiments, the functionality of the wireless communication device 2300 described above (e.g., one or more functions of the wireless communication device 812 or UE as described herein) may be fully or partially implemented in software that is, e.g., stored in the memory 2304 and executed by the processor(s) 2302. Note that the wireless communication device 2300 may include additional components not illustrated in FIG. 23 such as, e.g., one or more user interface components (e.g., an input/output interface including a display, buttons, a touch screen, a microphone, a speaker(s), and/or the like and/or any other components for allowing input of information into the wireless communication device 2300 and/or allowing output of information from the wireless communication device 2300), a power supply (e.g., a battery and associated power circuitry), etc.

In some embodiments, a computer program including instructions which, when executed by at least one processor, causes the at least one processor to carry out the functionality of the wireless communication device 2300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
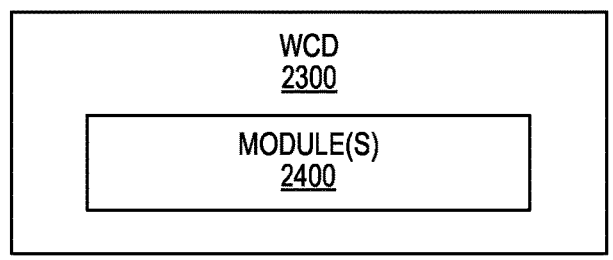
FIG. 24 illustrates a schematic block diagram of the wireless communication device according to some embodiments of the present disclosure.

FIG. 24 is a schematic block diagram of the wireless communication device 2300 according to some other embodiments of the present disclosure. The wireless communication device 2300 includes one or more modules 2400, each of which is implemented in software. The module(s) 2400 provide the functionality of the wireless communication device 2300 described herein (e.g., one or more functions of the wireless communication device 812 or UE as described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Function
AN Access Network
AP Access Point
ASIC Application Specific Integrated Circuit
AUSF Authentication Server Function
BWP BandWidth Part
CDM Code Division Multiplexing
CE Control Element
CPU Central Processing Unit
CSI-RS Channel State Information Reference Signal
DCI Downlink Control Information
DMRS Demodulation Reference Signal
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HSS Home Subscriber Server
IoT Internet of Things
IP Internet Protocol
LTE Long Term Evolution
MAC Medium Access Control
MME Mobility Management Entity
mmWave Millimeter Wave
MTC Machine Type Communication
NC-JT Non-Coherent Joint Transmission
NEF Network Exposure Function
NF Network Function
NR New Radio
NRF Network Function Repository Function
NSSF Network Slice Selection Function
PCF Policy Control Function
PDSCH Physical Downlink Shared Channel
P-GW Packet Data Network Gateway
QCL Quasi Co-Located
QoS Quality of Service
RAM Random Access Memory
RAN Radio Access Network ROM Read Only Memory
RRC Radio Resource Control
RRH Remote Radio Head
RS Reference Signal
RSRP Reference Signal Received Power
RTT Round Trip Time
SCEF Service Capability Exposure Function
SINR Signal-To-Interference-plus-Noise Ratio
SMF Session Management Function
SSB Synchronization Signal Block
TCI Transmission Configuration Indicator
TRP Transmission/Reception Point
TRS Tracking Reference Signal
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device for implicit Transmission Configuration Indicator, TCI, state activation, the method comprising:
   sending a measurement report for one or more reference signals to a base station, the one or more reference signals being related to one or more TCI states, respectively;
   activating at least one TCI state from among the one or more TCI states that are related to the one or more reference signals, a list of activated TCI states being configured for the wireless communication device, and a number, M, of entries in the list are reserved for implicit TCI state activation, the measurement report being a beam sweep report; and
   a set of codepoints for a DCI field used for TCI state selection comprising a number, M, of codepoints that are reserved for implicitly activated TCI states and a number, N, of codepoints that are reserved for explicitly updated TCI states.

2. The method of claim 1, wherein a number, N, of entries in the list are reserved for explicit TCI state activation.

3. The method of claim 2 wherein a value of N is predefined or configured.

4. The method of claim 1, wherein M is greater than or equal to 1, and N is greater than M.

5. The method of claim 1 wherein a value of N and/or a value of M is predefined.

6. The method of claim 1 wherein a value of N and/or a value of M is configured.

7. The method of claim 1 wherein the M codepoints that are reserved for implicit TCI activation are the first M codepoints in the set of codepoints for the DCI field.

8. The method of claim 1 wherein the M codepoints that are reserved for implicit TCI activation are the last M codepoints in the set of codepoints for the DCI field.

9. The method of claim 1 further comprising receiving a MAC CE to update the TCI states, and updating only those TCI states that correspond to the codepoints of the DCI field that are reserved for explicit TCI state activation.

10. The method of claim 1 further comprising receiving a DCI comprising the DCI field for explicit TCI state activation, and updating only those TCI states that correspond to the codepoints in the DCI field of the received DCI that are reserved for explicit TCI state activation.

11. The method of claim 1 wherein M=1, and the codepoint reserved for implicit TCI state activation is the same codepoint from one occasion of implicit TCI state activation to another.

12. The method of claim 1 wherein M is greater than or equal to 2, and the at least one TCI state activated is a single TCI state such that the M codepoints reserved for implicit TCI state activation represent the single TCI state and up to M−1 previously activated TCI states.

13. The method of claim 1 wherein each codepoint can be mapped to one or more TCI states.

14. The method of claim 1 wherein a value of M is predefined or configured.

15. The method of claim 1 wherein activating the at least one TCI state comprises determining that the at least one TCI state is not already activated for the wireless communication device and activating the at least one TCI state responsive to determining that the at least one TCI state is not already activated for the wireless communication device.

16. A wireless communication device configured to:
   send a measurement report for one or more reference signals to a base station, the one or more reference signals being related to one or more Transmission Configuration Indicator, TCI, states, respectively;
   activate at least one TCI state from among the one or more TCI states that are related to the one or more reference signals, a list of activated TCI states being configured for the wireless communication device, and a number, M, of entries in the list are reserved for implicit TCI state activation, the measurement report being a beam sweep report; and
   a set of codepoints for a DCI field used for TCI state selection comprising a number, M, of codepoints that are reserved for implicitly activated TCI states and a number, N, of codepoints that are reserved for explicitly updated TCI states.

17. A method performed by a base station comprising:
   receiving a measurement report for one or more reference signals from a wireless communication device, the one or more reference signals being related to one or more Transmission Configuration Indicator, TCI, states, respectively;
   activating at least one TCI state from among the one or more TCI states that are related to the one or more reference signals, a list of activated TCI states being configured for the wireless communication device, and a number, M, of entries in the list are reserved for implicit TCI state activation, the measurement report being a beam sweep report; and
   a set of codepoints for a DCI field used for TCI state selection comprising a number, M, of codepoints that are reserved for implicitly activated TCI states and a number, N, of codepoints that are reserved for explicitly updated TCI states.

18. A base station configured to:
   receive a measurement report for one or more reference signals from a wireless communication device, the one or more reference signals being related to one or more Transmission Configuration Indicator, TCI, states, respectively;
   activate at least one TCI state from among the one or more TCI states that are related to the one or more reference signals, a list of activated TCI states being configured for the wireless communication device, and a number, M, of entries in the list are reserved for implicit TCI state activation, the measurement report being a beam sweep report; and a set of codepoints for a DCI field used for TCI state selection comprising a number, M, of codepoints that are reserved for implicitly activated TCI states and a number, N, of codepoints that are reserved for explicitly updated TCI states.

* * * * *